United States Patent
Geva et al.

(10) Patent No.: US 11,580,409 B2
(45) Date of Patent: Feb. 14, 2023

(54) SYSTEM AND METHOD FOR ITERATIVE CLASSIFICATION USING NEUROPHYSIOLOGICAL SIGNALS

(71) Applicant: InnerEye Ltd., Herzeliya (IL)

(72) Inventors: Amir B. Geva, Tel-Aviv (IL); Eitan Netzer, Kiryat-Tivon (IL); Ran El Manor, Savyon (IL); Sergey Vaisman, Ramat-Gan (IL); Leon Y. Deouell, Tel-Aviv (IL); Uri Antman, Ramat-HaSharon (IL)

(73) Assignee: InnerEye Ltd., Herzeliya (IL)

( * ) Notice: Subject to any disclaimer, the term of this patent is extended or adjusted under 35 U.S.C. 154(b) by 845 days.

(21) Appl. No.: 16/471,587

(22) PCT Filed: Dec. 21, 2017

(86) PCT No.: PCT/IB2017/058297
§ 371 (c)(1),
(2) Date: Jun. 20, 2019

(87) PCT Pub. No.: WO2018/116248
PCT Pub. Date: Jun. 28, 2018

(65) Prior Publication Data
US 2020/0193299 A1    Jun. 18, 2020

Related U.S. Application Data

(60) Provisional application No. 62/437,065, filed on Dec. 21, 2016.

(51) Int. Cl.
*G06F 3/01* (2006.01)
*G06K 9/62* (2022.01)
(Continued)

(52) U.S. Cl.
CPC .............. *G06N 3/088* (2013.01); *G06F 3/015* (2013.01); *G06F 3/017* (2013.01); *G06K 9/6215* (2013.01);
(Continued)

(58) Field of Classification Search
CPC .... G06T 7/0012; G06N 3/0454; G06N 20/20; G06N 3/088; G06K 9/6269; G06K 9/6256;
(Continued)

(56) References Cited

U.S. PATENT DOCUMENTS 6,564,176 B2 *  5/2003  Kadtke ................ G06K 9/6217
                                                    703/2
8,374,687 B2   2/2013  Mathan et al.
(Continued)

FOREIGN PATENT DOCUMENTS

AU    2015267333    11/2016
CA    2986204       12/2016
(Continued)

OTHER PUBLICATIONS

Martinez et al. "Structural constraints on learning in the neural network" J Neurophysiol114: 2555-2557, 2015.First published Mar. 25, 2015; doi:10.1152/jn.00971.2014, pp. 1-3.*
(Continued)

*Primary Examiner* — Mia M Thomas

(57) ABSTRACT

A method of training an image classification neural network comprises: presenting a first plurality of images to an observer as a visual stimulus, while collecting neurophysiological signals from a brain of the observer; processing the neurophysiological signals to identify a neurophysiological event indicative of a detection of a target by the observer in at least one image of the first plurality of images; training the image classification neural network to identify the target in
(Continued)

the image, based on the identification of the neurophysiological event; and storing the trained image classification neural network in a computer-readable storage medium.

31 Claims, 14 Drawing Sheets

(51) Int. Cl.
  *G06T 7/00* (2017.01)
  *G06N 3/088* (2023.01)
  *G06N 20/20* (2019.01)
  *G06N 3/04* (2023.01)

(52) U.S. Cl.
  CPC ......... *G06K 9/6218* (2013.01); *G06K 9/6256* (2013.01); *G06K 9/6269* (2013.01); *G06N 3/0454* (2013.01); *G06N 20/20* (2019.01); *G06T 7/0012* (2013.01); *G06T 2207/20081* (2013.01); *G06T 2207/20084* (2013.01); *G06T 2207/30016* (2013.01)

(58) Field of Classification Search
  CPC .... G06K 9/6218; G06K 9/6215; G06F 3/017; G06F 3/015
  See application file for complete search history.

(56) References Cited

U.S. PATENT DOCUMENTS

| | | | |
|---|---|---|---|
| 10,303,971 B2* | 5/2019 | Geva | G06K 9/627 |
| 10,948,990 B2* | 3/2021 | Geva | G06K 9/6272 |
| 2008/0137969 A1* | 6/2008 | Rueckert | G06K 9/6234 382/224 |
| 2012/0172743 A1* | 7/2012 | Aguilar | A61B 5/7267 600/301 |
| 2013/0158883 A1* | 6/2013 | Hasegawa | A61B 5/369 702/19 |
| 2014/0226879 A1* | 8/2014 | Westerman | G06V 40/13 382/125 |
| 2015/0277560 A1* | 10/2015 | Beaty | G06F 3/015 345/156 |
| 2016/0103487 A1* | 4/2016 | Crawford | A61B 5/117 600/544 |
| 2017/0188933 A1* | 7/2017 | Huggins | A61F 4/00 |
| 2018/0221661 A1* | 8/2018 | Choe | A61M 21/02 |
| 2019/0035113 A1* | 1/2019 | Salvi | G06T 9/002 |
| 2019/0159737 A1* | 5/2019 | Buckler | G16H 50/50 |
| 2020/0210755 A1* | 7/2020 | Luongo | G06K 9/6232 |
| 2020/0213276 A1* | 7/2020 | Luongo | G06F 17/16 |
| 2020/0218776 A1* | 7/2020 | Shah | G06N 7/005 |
| 2020/0272857 A1* | 8/2020 | Arcot Desai | G06K 9/00536 |
| 2020/0364539 A1* | 11/2020 | Anisimov | G06F 3/015 |
| 2020/0364599 A1* | 11/2020 | Ma | G06N 10/00 |
| 2020/0397383 A1* | 12/2020 | Genov | A61B 5/7267 |
| 2022/0037023 A1* | 2/2022 | Armstrong | G16H 40/67 |
| 2022/0122250 A1* | 4/2022 | Besson | A61B 5/4842 |

FOREIGN PATENT DOCUMENTS

| | | |
|---|---|---|
| CN | 105868712 | 8/2016 |
| WO | WO 2015/183737 | 12/2015 |
| WO | WO 2016/193979 | 12/2016 |
| WO | WO 2018/116248 | 6/2018 |

OTHER PUBLICATIONS

Kietzmann, et al. "Deep Neural Networks in Computational Neuroscience" Oxford Research Encyclopaedia of Neuroscience doi: 10.1093/acrefore/9780190264086.013.46 Jun. 5, 2018.*
Schmidhuber, J. "Deep Learning in Neural Networks: An Overview" vol. 61, Jan. 2015, pp. 85-117.*
Nicholson, E. "Interaction of noradrenaline and cortisol predicts negative intrusive memories in posttraumatic stress disorder" Neurobiology of Learning and Memory 112, Dec. 1, 2013, pp. 1-8 (204-211).*
Kietzmann, T. "Deep Neural Networks in Computational Neuroscience" Oxford Research Encyclopedia of Neuroscience, Jun. 5, 2018, pp. 1-28.*
Notification of Office Action and Search Report dated May 31, 2021 From the State Intellectual Property Office of the People's Republic of China Re. Application No. 201780081627.6. (12 Pages).
Translation Dated Jun. 16, 2021 of Notification of Office Action dated May 31, 2021 From the State Intellectual Property Office of the People's Republic of China Re. Application No. 201780081627. 6. (17 Pages).
Notice of Reasons for Rejection dated Mar. 2, 20121 From the Japan Patent Office Re. Application No. 2019-533183 and Its Translation Into Enghsh. (10 Pages).
International Preliminary Report on Patentability dated Jul. 4, 2019 From the International Bureau of WIPO Re. Application No. PCT/IB2017/058297. (6 Pages).
International Search Report and the Written Opinion dated Feb. 27, 2018 From the International Searching Authority Re. Application No. PCT/IB2017/058297. (9 Pages).
Bigdely-Shamlo et al. "Brain Activity-Based Image Classification From Rapid Serial Visual Presentation", IEEE Transactions on Neural Systems and Rehabilitation Engineering, 16(5): 432-441, Oct. 2008.
Office Action dated Jan. 5, 2021 From the Israel Patent Office Re. Application No. 267518 and Its Translation Into English. (5 Pages).
Examination Report Under Sections 12 & 13 of the Patents Act, 1970 and the Patents Rules, 2003 dated Jun. 8, 2021 From the Government of India, Intellectual Property India, Patents, Designs, Trade Marks, Geographical Indications, The Patent Office Re. Application No. 201927027739. (5 Pages).
Communication Pursuant to Article 94(3) EPC dated Nov. 29, 2021 From the European Patent Office Re. Application No. 17883,157. (8 Pages).
Supplementary European Search Report and the European Search Opinion dated Jun. 22, 2020 From the European Patent Office Re. Application No. 17883157.4. (5 Pages).
Notification of Office Action dated Apr. 6, 2022 From the State Intellectual Property Office of the People's Republic of China Re. Application No. 201780081627.6. (7 Pages).
English Translation Dated Apr. 28, 2022 of Notification of Office Action dated Apr. 6, 2022 From the State Intellectual Property Office of the People's Republic of China Re. Application No. 201780081627.6. (7 Pages).
Translation Dated Apr. 28, 2022 of Notification of Decision of Refusal dated Apr. 6, 2022 From the China National Intellectual Property Administration Re. Application No. 201780081627.6. (14 Pages).
Office Action dated May 31, 2022 From the Israel Patent Office Re. Application No. 267518 and Its Translation Into English. (9 Pages).

* cited by examiner

SYSTEM AND METHOD FOR ITERATIVE CLASSIFICATION USING NEUROPHYSIOLOGICAL SIGNALS

RELATED APPLICATION/S

This application claims the benefit of priority of U.S. Provisional Patent Application No. 62/437,065 filed Dec. 21, 2016, the contents of which are incorporated herein by reference in their entirety

FIELD AND BACKGROUND OF THE INVENTION

The present invention, in some embodiments thereof, relates to a Brain Computer Interface (BCI) and, more particularly, but not exclusively, system and method for iterative classification using neurophysiological signals.

BCI applications depend on decoding brain activity in response to single events (trials), as opposed to delineation of the average response frequently studied in basic research. Electroencephalography (EEG), a noninvasive recording technique, is one of the commonly used systems for monitoring brain activity. EEG data is simultaneously collected from a multitude of channels at a high temporal resolution, yielding high dimensional data matrices for the representation of single trial brain activity. In addition to its unsurpassed temporal resolution, EEG is non-invasive, wearable, and more affordable than other neuroimaging techniques, and is thus a prime choice for any type of practical BCI.

Traditional classification techniques use machine-learning algorithms to classify single-trial spatio-temporal activity matrices based on statistical properties of those matrices. These methods are based on two main components: a feature extraction mechanism for effective dimensionality reduction, and a classification algorithm. Typical classifiers use a sample data to learn a mapping rule by which other test data can be classified into one of two or more categories. Classifiers can be roughly divided to linear and non-linear methods. Non-linear classifiers, such as Neural Networks, Hidden Markov Model and k-nearest neighbor, can approximate a wide range of functions, allowing discrimination of complex data structures. While non-linear classifiers have the potential to capture complex discriminative functions, their complexity can also cause overfitting and carry heavy computational demands, making them less suitable for real-time applications.

Linear classifiers, on the other hand, are less complex and are thus more robust to data overfitting. Linear classifiers perform particularly well on data that can be linearly separated. Fisher Linear discriminant (FLD), linear Support Vector Machine (SVM) and Logistic Regression (LR) are examples of linear classifiers. FLD finds a linear combination of features that maps the data of two classes onto a separable projection axis. The criterion for separation is defined as the ratio of the distance between the classes mean to the variance within the classes. SVM finds a separating hyper-plane that maximizes the margin between the two classes. LR, as its name suggests, projects the data onto a logistic function.

International publication No. WO2014/170897, the contents of which are hereby incorporated by reference, discloses a method for conduction of single trial classification of EEG signals of a human subject generated responsive to a series of images containing target images and non-target images. The method comprises: obtaining the EEG signals in a spatio-temporal representation comprising time points and respective spatial distribution of the EEG signals; classifying the time points independently, using a linear discriminant classifier, to compute spatio-temporal discriminating weights; using the spatio-temporal discriminating weights to amplify the spatio-temporal representation by the spatio-temporal discriminating weights at tempo-spatial points respectively, to create a spatially-weighted representation; using Principal Component Analysis (PCA) on a temporal domain for dimensionality reduction, separately for each spatial channel of the EEG signals, to create a PCA projection; applying the PCA projection to the spatially-weighted representation onto a first plurality of principal components, to create a temporally approximated spatially weighted representation containing for each spatial channel, PCA coefficients for the plurality of principal temporal projections; and classifying the temporally approximated spatially weighted representation, over the number of channels, using the linear discriminant classifier, to yield a binary decisions series indicative of each image of the images series as either belonging to the target image or to the non-target image.

International publication No. WO2016/193979, the contents of which are hereby incorporated by reference discloses a method of classifying an image. A computer vision procedure is applied to the image to detect therein candidate image regions suspected as being occupied by a target. An observer is presented with each candidate image region as a visual stimulus, while collecting neurophysiological signals from the observer's brain. The neurophysiological signals are processed to identify a neurophysiological event indicative of a detection of the target by the observer. An existence of the target in the image is determined based on the identification of the neurophysiological event.

SUMMARY OF THE INVENTION

According to an aspect of some embodiments of the present invention there is provided a method of training an image classification neural network. The method comprises: presenting a first plurality of images to an observer as a visual stimulus, while collecting neurophysiological signals from a brain of the observer; processing the neurophysiological signals to identify a neurophysiological event indicative of a detection of a target by the observer in at least one image of the first plurality of images; training the image classification neural network to identify the target in the image, based on the identification of the neurophysiological event; and storing the trained image classification neural network in a computer-readable storage medium.

According to some embodiments of the invention the method comprises applying unsupervised clustering to a second plurality of images, and selecting the first plurality of images from the second plurality of images based on the unsupervised clustering.

According to some embodiments of the invention the method comprises applying the trained image classification neural network to a second plurality of images to detect therein candidate images suspected as being occupied by the target, wherein the second plurality of images comprises at least one image of the first plurality of images. The method further comprises re-defining the second plurality of images, wherein at least one image of the redefined second plurality of images is a candidate image as detected by the trained image classification neural network. The method further comprises repeating the presentation, the collection and processing of the neurophysiological signals, and the training for at least one image of the redefined first plurality of images, thereby iteratively training the image classification neural network.

According to some embodiments of the invention the method comprises tiling an input image into a plurality of image tiles, wherein the first plurality of images comprises a portion of the plurality of image tiles.

According to some embodiments of the invention the second plurality of images comprises the plurality of image tiles.

According to some embodiments of the invention the re-defining the second plurality of images, comprises re-tiling the input image into a plurality of images, wherein at least one image of the retiled input image comprises the candidate image.

According to some embodiments of the invention the method comprises applying unsupervised clustering to the second plurality of images, and selecting the first plurality of images from the second plurality of images based on the unsupervised clustering.

According to some embodiments of the invention the method comprises randomly selecting the first plurality of images from the second plurality of images.

According to some embodiments of the invention the method comprises receiving a reference image including the target, and selecting the first plurality of images from the second plurality of images responsively to the reference image.

According to some embodiments of the invention the image classification neural network is a convolutional neural network.

According to some embodiments of the invention the image classification neural network comprises a first neural subnetwork configured for receiving and processing the neurophysiological data, a second neural subnetwork configured for receiving and processing the second plurality of images, and a shared subnetwork having a neural network layer receiving and combining outputs from both the first neural subnetwork and the second neural subnetwork.

According to some embodiments of the invention the image classification neural network is a convolutional neural network and at least one of the first and the second neural subnetworks is a convolutional neural subnetwork.

According to some embodiments of the invention the image classification neural network comprises a first separate output layer for the first neural subnetwork outputting a first score, and second separate output layer for the second neural subnetwork outputting a second score, and wherein the method comprises combining the first score with the second score to a combined score, labeling the image with the combined score, and using the label in at least one iteration of the training.

According to some embodiments of the invention the combined score is a weighted sum of the first and the second score.

According to some embodiments of the invention the image classification neural network comprises an autoencoder subnetwork for unsupervised feature learning.

According to some embodiments of the invention the autoencoder subnetwork is used for selecting the first plurality of images.

According to some embodiments of the invention the method comprises scoring the neurophysiological event using the neurophysiological signals, wherein the training is based at least in part on the score.

According to some embodiments of the invention the method comprises using the score for determining a level of similarity of the target to an object in an image observed by the observer.

According to some embodiments of the invention the method comprises presenting to the observer a stimulus describing the target prior to the presentation of the first plurality of images, wherein the stimulus comprises at least one stimulus selected from the group consisting of a visual stimulus, a textual stimulus, an auditory stimulus and an olfactory stimulus.

According to some embodiments of the invention the method comprises presenting to the observer a stimulus complementary to the target prior to the presentation of the first plurality of images, wherein the stimulus comprises at least one stimulus selected from the group consisting of a visual stimulus, a textual stimulus, an auditory stimulus and an olfactory stimulus.

According to an aspect of some embodiments of the present invention there is provided a system for training an image classification neural network, comprising: a neurophysiological signal collection system, configured for collecting neurophysiological signals from a brain of an observer; and a data processor, communicating with the neurophysiological signal collection system and being configured for executing the method as delineated above and optionally and preferably detailed hereinbelow.

According to an aspect of some embodiments of the present invention there is provided a method of classifying an image, comprising: executing the method train the image classification neural network; and applying the trained image classification neural network to the image to determine an existence of the target in the image based on a score generated by an output layer of the trained image classification neural network.

According to an aspect of some embodiments of the present invention there is provided a method of classifying an image, comprising: applying to the image the method as delineated above and optionally and preferably detailed hereinbelow; applying the trained image classification neural network to the image to determine whether the image is suspected as being occupied by a target; presenting the image to the observer as a visual stimulus, while collecting neurophysiological signals from a brain of the observer; determining an existence of the target in the image based, at least in part, on the identification of the neurophysiological event.

According to an aspect of some embodiments of the present invention there is provided a method of image classification, comprising: applying a trained image classification neural network to the image to detect therein candidate image regions suspected as being occupied by a target; presenting to an observer each candidate image region as a visual stimulus, while collecting neurophysiological signals from a brain of the observer; determining an existence of the target in the image is based, at least in part, on the identification of the neurophysiological event.

According to an aspect of some embodiments of the present invention there is provided a method of image classification, comprising: applying a trained image classification neural network to each of a plurality of images to detect therein candidate images suspected as being occupied by a target; presenting to an observer each candidate image as a visual stimulus, while collecting neurophysiological signals from a brain of the observer; determining an existence of the target in the candidate image is based, at least in part, on the identification of the neurophysiological event.

According to an aspect of some embodiments of the present invention there is provided a system for image classification, comprising: a neurophysiological signal collection system, configured for collecting neurophysiological signals from a brain of an observer; and a data processor, communicating with the neurophysiological signal collection system and being configured for executing the method as delineated above and optionally and preferably detailed hereinbelow.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
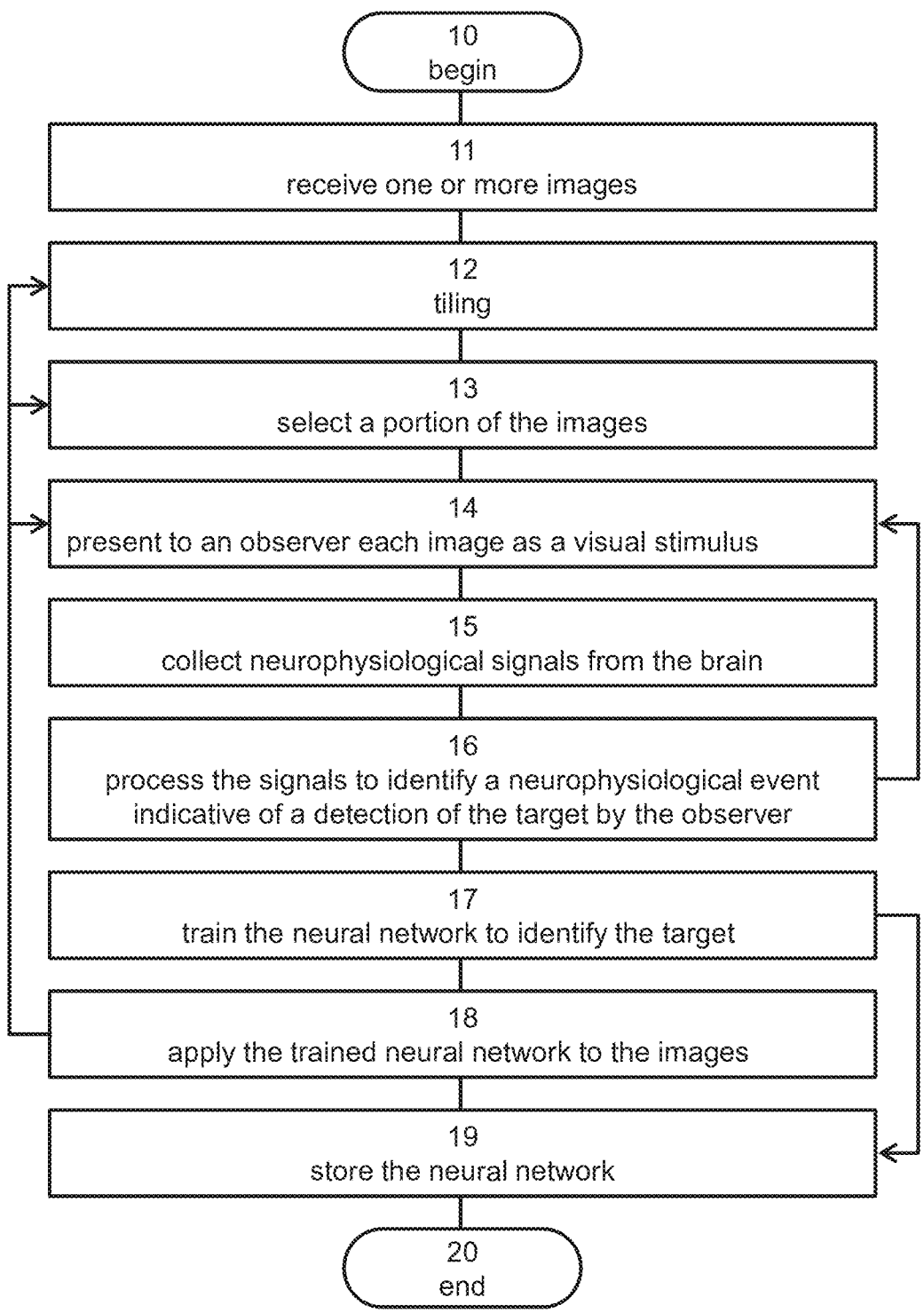
FIG. 1 is a flowchart diagram of a method suitable for training an image classification neural network, according to some embodiments of the present invention.

The present invention, in some embodiments thereof, relates to a Brain Computer Interface (BCI) and, more particularly, but not exclusively, system and method for iterative classification using neurophysiological signals.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Visual object classification by computer vision is very fast and accurate provided the sought object is well defined and its exemplars are available in the training dataset. However, it was found by the Inventors that in some cases, visual data interpretation tasks have to deal with a wide variety of potential targets or even unknown targets that do not match examples from the training set. The Inventors also found that the targets definition might change during the interpretation task. The Inventors found that the human visual perception can handle such challenges with high accuracy. The Inventors realize that in the case of large high resolution images or large sets of discrete images, it may require tens of minutes or even hours to analyze the images and detect targets or objects of interest in them, since the throughput of human analyst is low (for example, it might take a few seconds to manually scan a single image).

The Inventors therefore devised a technique that combines Rapid Serial Visual Presentation (RSVP) of images, with EEG acquisition, preferably real-time EEG acquisition (e.g., within less than 1 second). The inventive technique can be used for classification at a rate which is much faster compared to traditional classification techniques. The method and system of the present embodiments optionally and preferably provide an iterative process in which the training of a neural network is iteratively updated based on the output of human observer's classification, wherein an input pertaining to the human observer's classification is extracted from EEG signal recorded while the human observer's performs the classification. Then, the output of the updated neural network is optionally and preferably used to select an updated set of images which is iteratively shown to the human observer.

The technique of the present embodiments can be applied for large images, such as, but not limited to, aerial images or high resolution images from cameras covering wide areas.

The technique of the present embodiments can alternative be applied to sets of images, e.g., set containing 10 or more, or 50 or more, or 250 or more, or 1250 or more images, wherein at least a portion of the images contain a target, and the method and system of the present embodiments identifies or label those images. The technique of the present embodiments can be applied for a single image or automatically determining whether the single image contains a target.

The technique of the present embodiments can be used both for binary identification of an image or an image portion containing a target, and for non-binary classification of an image or an image portion, wherein the binary classification provides a binary score indicative whether or not the image or image portion contains the target, and the non-binary classification provides a non-binary score indicative of the likelihood that the image or an image portion contains the target, or the level of similarity between the target and an object in the image or image portion. In some embodiments of the present invention any of the binary score and the non-binary score is used for training of the neural network.

At least part of the operations described herein can be can be implemented by a data processing system, e.g., a dedicated circuitry or a general purpose computer, configured for receiving data and executing the operations described below. At least part of the operations can be implemented by a cloud-computing facility at a remote location.

Computer programs implementing the method of the present embodiments can commonly be distributed to users by a communication network or on a distribution medium such as, but not limited to, a floppy disk, a CD-ROM, a flash memory device and a portable hard drive. From the communication network or distribution medium, the computer programs can be copied to a hard disk or a similar intermediate storage medium. The computer programs can be run by loading the code instructions either from their distribution medium or their intermediate storage medium into the execution memory of the computer, configuring the computer to act in accordance with the method of this invention. All these operations are well-known to those skilled in the art of computer systems.

Processing operations described herein may be performed by means of processor circuit, such as a DSP, microcontroller, FPGA, ASIC, etc., or any other conventional and/or dedicated computing system.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

Some embodiments of the present invention concern a method and system suitable for training an image classification neural network.

Neural networks are a class of computer implemented techniques based on a concept of inter-connected "neurons." In a typical neural network, neurons contain data values, each of which affects the value of a connected neuron according to connections with pre-defined strengths, and whether the sum of connections to each particular neuron meets a pre-defined threshold. By determining proper connection strengths and threshold values (a process also referred to as training), a neural network can achieve efficient recognition of images and characters. Oftentimes, these neurons are grouped into layers in order to make connections between groups more obvious and to each computation of values. Each layer of the network may have differing numbers of neurons, and these may or may not be related to particular qualities of the input data.

In one implementation, called a fully-connected neural network, each of the neurons in a particular layer is connected to and provides input value to those in the next layer. These input values are then summed and this sum compared to a bias, or threshold. If the value exceeds the threshold for a particular neuron, that neuron then holds a positive value which can be used as input to neurons in the next layer of neurons. This computation continues through the various layers of the neural network, until it reaches a final layer. At this point, the output of the neural network routine can be read from the values in the final layer.

Unlike fully-connected networks or subnetworks which associate a single value with each neuron of the network or subnetwork, convolutional neural networks or subnetworks operate by associating an array of values with each neuron. Conceptually, this array can be thought of as a small patch of the image to be classified. The transformation of a neuron value for the subsequent layer is generalized from multiplication to convolution. This implies that the connection strengths are convolution kernels rather than scalar values. These more complex transformations involve more complex neural network matrices. Thus, while a matrix in a fully-connected network or subnetwork comprises an array of number values, in a convolutional neural network or subnetwork, each matrix entry is a patch of pixels.

The neural network to be trained is optionally and preferably, but not necessarily, a convolutional neural network. A representative example of an image classification neural network suitable for the present embodiments is described hereinunder.

Referring now to the drawings, FIG. 1 is a flowchart diagram of the method according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally and preferably continues to 11 at which one or more input images is received. When the received image is large (e.g., a aerial image or an image captured by a camera covering a wide field-of-view, e.g., a panoramic image), the method optionally and preferably continues to 12 at which the image is tiled into a plurality of tiles, each to be used by the method as a separate input image. Alternatively, the method can receive a plurality of input images at 11, in which case 12 can be skipped. Also contemplated are embodiments in which the method receives a plurality of images, and tiles one or more or each of these images. Generally, any input image received at 11 can be used by the method for training the image classification neural network, whether or not it is tiled.

The method optionally and preferably continues to 13 at which a portion of the images is selected. This can be done in more than one way.

In some embodiments of the present invention the images are selected randomly, according to a uniform distribution or any other distribution.

In some embodiments of the present invention a reference image that includes a target is received, and the portion is selected responsively to reference image. For example, a coarse image processing procedure can be applied to select images that have a similarity level higher than a predetermined threshold to the reference image. Preferably, at least a few images that have a similarity level lower than a predetermined threshold are also selected, to allow better training. The ratio of images with high similarity to images with low similarity to the reference image can optionally and preferably be from about 1 to about 10. Alternatively or additionally, an initial target model can be built by augmenting the reference image (e.g., by creating rotated images), and an unsupervised autoencoder can be used to learn the features representing the reference image. Thereafter, the portion of the images can be selected based on distances from the mean image. The ratio of images with long distance (e.g., above a predetermined threshold) to images with short distance (e.g., less than a predetermined threshold) image can optionally and preferably be from about 1 to about 10.

In some embodiments of the present invention unsupervised clustering is applied to the images, and the portion is selected based on the unsupervised clustering. Clusters may match different types of objects presented in the images, with one of the clusters being objects resembling the targets. The method can sample a portion of the clusters, and select several images from each cluster. The ratio of images from the cluster of images resembling the target to images from other clusters can optionally and preferably be from about 1 to about 10. The largest cluster can contain distracting features. In some embodiments, this cluster is omitted to reduce the amount of data to be reviewed by the observer.

At 14 the images or, more preferably, the portion of the images is presented to an observer as a visual stimulus, and at 15 neurophysiological signals are collected from a brain of observer. Operation 15 is preferably executed contemporaneously with the visual stimulus 14, so that the collected signals include also signals that are indicative of the observer's response to the visual stimulus.

The images are preferably presented serially at a sufficiently high rate. Such presentation is referred to as Rapid Serial Visual Presentation (RSVP). The rate is preferably selected so that it can cope with overlapping responses in a rapid series of visual presentation. Representative presentation rates suitable for the present embodiments are from about 2 Hz to about 20 Hz or from about 2 Hz to about 15 Hz or from about 2 Hz to about 10 Hz or from about 5 Hz to about 20 Hz or from about 5 Hz to about 15 Hz or from about 5 Hz to about 10 Hz.

The neurophysiological signals are preferably encephalogram (EG) signals, such as electroencephalogram (EEG) signals or magnetoencephalogram (MEG) signals. Other types of signals are also contemplated, but the present inventors found that EEG signals are preferred.

The EEG signals are preferably collected, optionally and preferably simultaneously, from a multiplicity of electrodes (e.g., at least 4 or at least 16 or at least 32 or at least 64 electrodes), and optionally and preferably at a sufficiently high temporal resolution. In some embodiments of the present invention signals are sampled at a sampling rate of at least 150 Hz or at least 200 Hz or at least 250 Hz, e.g., about 256 Hz. Optionally, a low-pass filter of is employed to prevent aliasing of high frequencies. A typical cutoff frequency for the low pass filter is, without limitation, about 51 Hz.

When the neurophysiological signals are EEG signals, one or more of the following frequency bands can be defined: delta band (typically from about 1 Hz to about 4 Hz), theta band (typically from about 3 to about 8 Hz), alpha band (typically from about 7 to about 13 Hz), low beta band (typically from about 12 to about 18 Hz), beta band (typically from about 17 to about 23 Hz), and high beta band (typically from about 22 to about 30 Hz). Higher frequency bands, such as, but not limited to, gamma band (typically from about 30 to about 80 Hz), are also contemplated.

Electrodes can be placed at one or more, optionally and preferably all, of the following locations: two on the mastoid processes, two horizontal EOG channels positioned at the outer canthi of the left and right eyes, two vertical EOG channels, one below and one above the right eye, and a channel on the tip of the nose.

The method continues to 16 at which the neurophysiological signals are processed to identify a neurophysiological event indicative of a detection of the target by the observer. According to some embodiments, the observer is provided with a priori knowledge regarding the target that is to be identified in the image.

For example, the observer can be presented with a stimulus describing the target and the observer can be asked to memorize the target. The stimulus describing the target can be of any type, including, without limitation, a visual stimulus (e.g., an image of the target), a textual stimulus (e.g., a written description of the target), an auditory stimulus (e.g., an oral description of the target), an olfactory stimulus (e.g., a sample having an odor similar to an odor of the target). Also contemplated are embodiments in which the observer is presented with a stimulus that is complementary to the target. For example, the observer can be requested to memories an object wherein the target is defined as anything other than the target. The complementary stimulus be of any of the aforementioned types.

The processing 16 can be done in more than one way. Following is a description of several techniques that can be used for identifying a neurophysiological event in the neurophysiological signals.

The processing typically includes a digitization procedure that generates digital data from the signals. These data are typically arranged as a spatiotemporal matrix, in which the spatial dimension corresponds to electrode location on the scalp of the observer, and the temporal dimension is a discretization of the time axis into a plurality of time points or epochs, that may or may not be overlapped. The data can then be subjected to a dimensionality reduction procedure for mapping the data onto a lower dimensional space. The processing may optionally, but not necessarily, be based on frequency-bands relevant to target detection. Specifically, the processing may be primarily based on the P300 EEG wave.

The processing is preferably automatic and can be based on supervised or unsupervised learning from training data sets. Learning techniques that are useful for identifying a target detection events include, without limitation, Common Spatial Patterns (CSP), autoregressive models (AR) and Principal Component Analysis (PCA). CSP extracts spatial weights to discriminate between two classes, by maximizing the variance of one class while minimizing the variance of the second class. AR instead focuses on temporal, rather than spatial, correlations in a signal that may contain discriminative information. Discriminative AR coefficients can be selected using a linear classifier.

PCA is particularly useful for unsupervised learning. PCA maps the data onto a new, typically uncorrelated space, where the axes are ordered by the variance of the projected data samples along the axes, and only axes that reflect most of the variance are maintained. The result is a new representation of the data that retains maximal information about the original data yet provides effective dimensionality reduction.

Another method useful for identifying a target detection event employs spatial Independent Component Analysis (ICA) to extract a set of spatial weights and obtain maximally independent spatial-temporal sources. A parallel ICA stage is performed in the frequency domain to learn spectral weights for independent time-frequency components. PCA can be used separately on the spatial and spectral sources to reduce the dimensionality of the data. Each feature set can be classified separately using Fisher Linear Discriminants (FLD) and can then optionally and preferably be combined using naive Bayes fusion, by multiplication of posterior probabilities).

Another technique employs a bilinear spatial-temporal projection of event-related data on both temporal and spatial axes. These projections can be implemented in many ways. The spatial projection can be implemented, for example, as a linear transformation of signals into underlying source space or as ICA. The temporal projection can serve as a filter. The dual projections can be implemented on non-overlapping time windows of the single-trial data matrix, resulting in a scalar representing a score per window. The windows' scores can be summed or classified to provide a classification score for the entire single trial. In addition to the choice of this technique can support additional constraints on the structure of the projections matrix. One option is, for example, to learn the optimal time window for each channel separately and then train the spatial terms.

In various exemplary embodiments of the invention the method employs a Spatially Weighted Fisher Linear Discriminant (SWFLD) classifier to the neurophysiological signals. This classifier can be obtained by executing at least some of the following operations. Time points can be classified independently to compute a spatiotemporal matrix of discriminating weights. This matrix can then be used for amplifying the original spatiotemporal matrix by the discriminating weights at each spatiotemporal point, thereby providing a spatially-weighted matrix.

Preferably the SWFLD is supplemented by PCA. In these embodiments, PCA is optionally and preferably applied on the temporal domain, separately and independently for each spatial channel. This represents the time series data as a linear combination of components. PCA is optionally and preferably also applied independently on each row vector of the spatially weighted matrix. These two separate applications of PCA provide a projection matrix, which can be used to reduce the dimensions of each channel, thereby providing a data matrix of reduced dimensionality.

The rows of this matrix of reduced dimensionality can then be concatenated to provide a feature representation vector, representing the temporally approximated, spatially weighted activity of the signal. An FLD classifier can then be trained on the feature vectors to classify the spatiotemporal matrices into one of two classes. In the present embodiments, one class corresponds to a target identification event, and another class corresponds to other events. More details regarding the SWFLD classifier according to some embodiments of the present invention is provided in the Examples section that follows.

In various exemplary embodiments of the invention the method employs a neural network classifier, more preferably a convolutional neural network (CNN) classifier, to the neurophysiological signals. In these embodiments the CNN receives the signals as a spatiotemporal matrix and produces a score, typically in the range [0, 1] which estimates the probability that the presented visual stimulus is a target. The network can optionally and preferably be trained using stochastic gradient descent (SGD) to minimize a logistic regression cost function. In a preferred embodiment the CNN comprises a first convolution layer applying spatial filtering for each of a plurality of time points characterizing the neurophysiological signals, a second convolution layer applying temporal filtering to outputs provided by the first convolution layer, and optionally and preferably also a third convolution layer applying temporal filtering to outputs provided by the second convolution layer. The second and third convolution layers typically learn temporal patterns in the signal that represent the change in amplitude of the spatial maps learned by the first layer, and therefore advantageous since they improve the classification accuracy.

The CNN can also comprise two or more fully connected layers each providing a non-linear combination of the outputs provided by a layer preceding the respective fully connected layer. A first fully connected layer preferably receives output from the third convolutional layer (when a third convolutional layer is employed) or the second convolutional layer (preferably, but not necessarily, when a third convolutional layer is not employed). A second fully connected layer preferably receives output from the first from the first fully connected layer. Optionally, the CNN comprises two or more pooling layers, e.g., max-pooling layers, to reduce dimensionality. More details regarding the preferred CNN is provided in the Examples section that follows.

The processing 16 optionally and preferably comprises calculating a score describing the probability that a target exists in the image or the similarity between an object in the presented image and the target. The score is calculated using the respective classifier. For example, when the classifier is an SWFLD classifier, a Fisher score can be calculated, and when the classifier is a CNN classifier, the score can be the output of the logistic regression layer of the CNN.

In a preferred embodiment, the method employs an observer-specific score normalization function for normalizing the calculated score. Such an observer-specific score normalization function is typically prepared at a training stage in which the method is repeatedly executed for the same observer using a training dataset of images, wherein each image of the dataset is classified as either containing or not containing the target. The observer-specific score normalization function can also be target specific, in which case the training stage is repeated for each target to be detected. However, this need not necessarily be the case, since, for some applications, it may not be necessary to repeat the training for each target, since the observer's ability to detect different targets may be similar, particularly when the different targets belong to the same category (e.g., different vehicles, different faces, etc.). During the training stage, a first score distribution function is calculated for target classified as containing the target, and a second score distribution function is calculated for target classified as not containing the target. The score distribution functions that are calculated at the training stage, then used to normalize the score provided at the running stage. For example, denoting the first score distribution function by $g_1$, and the second score distribution function by $g_0$, a score s provided by the classifier at the running stage can be normalized to provide a normalized score $\tilde{s}$ defined as $\tilde{s}=g_1(s)/(g_0(s)+g_1(s))$.

The first and second score distribution functions can have a predetermined shape in the score space. Typically the shape is localized. Representative examples of types of distribution functions suitable for use as first and second score distribution functions including, without limitation, a Gaussian, a Lorenzian and a modified Bessel function.

The normalized score can be compared to a predetermined confidence threshold to determine the level of confidence of the identified detection event. When the normalized is below the predetermined confidence threshold, the method optionally and preferably loops back to 14 to re-present the respective image region or group of image regions to the observer and re-calculate the normalized score.

In some embodiments, two different types of classifiers are used and a score that weighs the scores provided by the individual classifiers is computed. For example, the method can apply an SWFLD classifier and calculate a SWFLD classification score based on the SWFLD classifier, applies a CNN classifier and calculate a CNN classification score based on the CNN classifier, and combines the SWFLD score and the CNN score. The combination of the two score may optionally and preferably be preceded by a score rescaling operation that brings the two scores to similar scale. The aforementioned normalization using the first and second score distribution functions can also serve for rescaling the scores.

In some embodiments of the present invention the method processes the neurophysiological signals to identify eye blinks. In these embodiments, when there is a positive identification of an eye blink during a presentation of an image region or group of image regions to the observer, the method optionally and preferably loops back to 14 and re-presents the respective image region or group of image regions to the observer. Eye blinks can be identified using any technique known in the art, such as the technique disclosed in U.S. Pat. No. 5,513,649 and U.S. Published Application No. 20150018704, the contents of which are hereby incorporated by reference.

Following the identification of the neurophysiological event, the method proceeds to 17 at which the image classification neural network is trained to identify the target in the image, based on the identification of the neurophysiological event. This can be done by assigning a label or a score to the image and feeding the image back to the image classification neural network. The label or score can be binary in which case it can assume one value (e.g., "1") when the image is identified as containing the target, and another value (e.g., "0") when the image is identified as not containing the target. The label or score can be non-binary in which case it can assume a value within a range of discrete or continuous values indicative of the likelihood that the image contains the target or the similarity between the target and an object in the image. The score can be, for example, the score calculated at 16.

If the image classification neural network was already trained on the same image, the method updates the training. The training or retraining can be applied to one or more layers of the image classification neural network, as desired. For deep networks, the training or retraining can be applied to one or more of the last hidden layers which contain less generic and more details-specific features. Optionally, the training or retraining can be applied to the output layer of the image classification neural network. In some embodiments of the present invention the training or retraining is applied to all the layers of the network.

The method optionally and preferably proceeds to 18 at which the trained image classification neural network is applied to at least a portion, more preferably all, the images received at 11 to detect therein candidate images suspected as being occupied by the target. Optionally, the detection by the network is then used for re-defining the images. For example, the number of images can be reduced so that the ratio between candidate images suspected as being occupied by the target and images suspected as being not occupied by the target is within a predetermined ratio interval (e.g., between 1 and 10). At least one image of the redefined set of images is a optionally and preferably a candidate image as detected by the trained image classification neural network. The method can then loop back to 13 or 14 and repeat at least some of the operations described herein so that the image classification neural network is trained using the neurophysiological signals in an iterative manner. When the images are image tiles of a larger input image, the method can loop back to 12 instead of 13 or 14 so that the redefining can be executed by re-tiling the larger input image into a plurality of images.

Following any execution stage of the method, e.g., following 17, the method can proceed to 19 at which the image classification neural network is stored in a computer-readable storage medium. The method ends at 20.

The advantage of using method 10 is that the brain's ability to process visual stimuli is automatically used for training an artificial neural network. This significantly improves the ability of the artificial neural network to accurately classify images, once trained, and reduces the training time, hence also the required computer resources.

Figure 2:
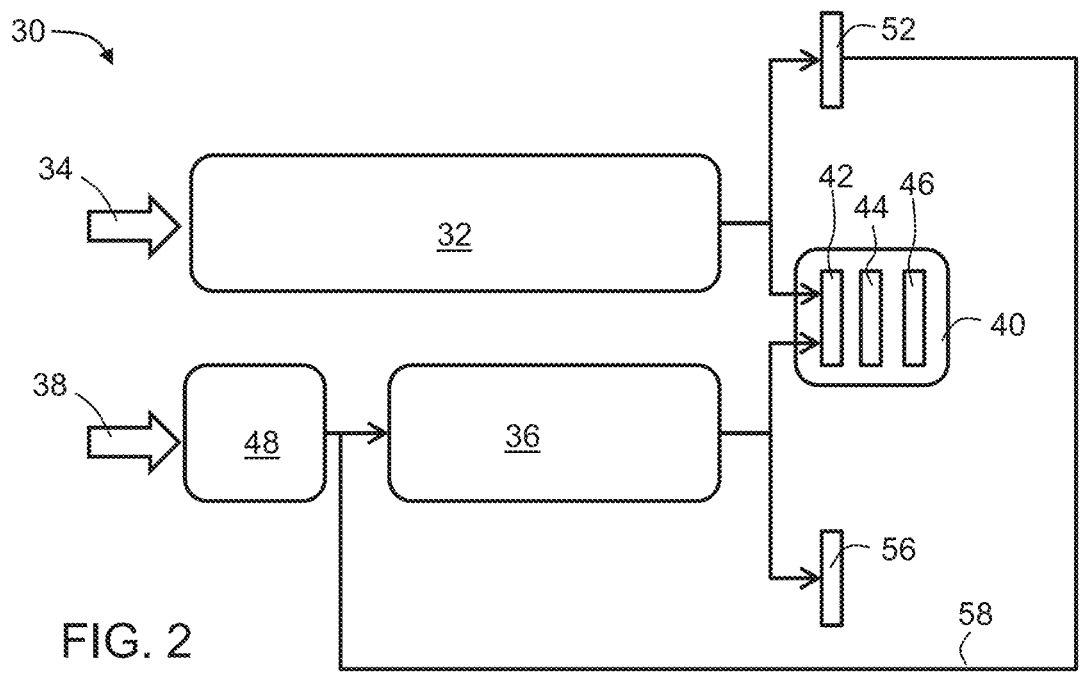
FIG. 2 is a schematic illustration of an image classification neural network, according to some embodiments of the present invention.

FIG. 2 is a schematic illustration of an image classification neural network 30 which can be trained using the method and system of the present embodiments, and which can at least in part be used, once trained (e.g., using the method and system of the present embodiments) for classifying an image. Neural network 30 preferably comprises a first neural subnetwork 32 configured for receiving and processing neurophysiological data 34, a second neural subnetwork 36 configured for receiving and processing images 38, and a shared subnetwork 40 having a neural network layer 42 receiving and combining outputs from both first neural subnetwork 32 and second neural subnetwork 36. Shared subnetwork 40 can also have one or more additional neural network layers e.g., one or more hidden layers 44 and an output layer 46. Neural network layer 42 is preferably a concatenation layer that concatenates the output features of the two subnetworks 32 and 36. Hidden layer 44 of shared subnetwork 40 can be a fully connected layer and the output layer can be a softmax layer. Subnetworks 32 and 36 are optionally and preferably structured for supervised machine learning.

During training of subnetwork 36, the output of neural subnetwork 32 can optionally and preferably be fed as a feedback 58 to subnetwork 36. For example, when the output layer of subnetwork 36 provides a binary or non-binary score for a particular image processed by subnetwork 32, the score can be used to label the particular image. The image and the associated label can be fed into the subnetwork 36, thereby facilitating a supervised or semi-supervised learning of subnetwork 36.

Network 30 optionally and preferably comprises an autoencoder subnetwork 48 that receives the images 38 extracts features from the images and provides them as input to subnetwork 36. In various exemplary embodiments of the invention autoencoder subnetwork 48 is employed during the training of network 30 and is not employed for image classification after network 30. Unlike subnetworks 32 and 36, autoencoder subnetwork 48 is preferably structured for unsupervised machine learning. The advantage of having autoencoder subnetwork 48 is that it allows a better training of subnetwork 36.

At an initial stage of the training of network 30, autoencoder subnetwork 48 is optionally and preferably fed by images labeled as not containing the target. The autoencoder subnetwork 48 extracts from the images features of non-targets. This simulates a scenario in which the shape of the target is unknown. Autoencoder subnetwork 48 learns features that model images containing non-targets. At later stages of the training, autoencoder subnetwork 48 can optionally and preferably fed by additional images, wherein the additional images may include images that are not associated with any label (namely images for which there is no knowledge whether or not they contain the target), and/or images that are associated with a binary or no-binary label or score.

Autoencoder subnetwork 48 can be a CNN having, aside for input and output layers, two or more sets of parallel feature map layers and one or more fully connected layers. One or more of the sets of parallel feature map layers can perform convolution and feed vectors of features to the fully connected layer(s). The fully connected layer(s) are optionally and preferably smaller in size (number of neuron elements) than the feature map layers, and can serve for encoding the features received from the of parallel feature map layers. One or more other sets of parallel feature map layers can receive the encoded features from the fully connected layer(s), and reconstructs or approximately reconstructs the feature vectors by performing deconvolution to the encoded features. The size of these feature map layers is optionally and preferably larger than the size of the fully connected layer, and is preferably selected such that the dimensionality of the reconstructed feature vectors is the same or approximately the same as the feature vectors generated from the images 38. The output layer(s) optionally and preferably concatenates the reconstructed feature vectors to restore the size of the input images 38.

In autoencoder subnetwork 48, a convolutional kernel can be used to feed the set(s) of parallel feature map layers by the input layers. A down-sampling kernel (e.g., a max pooling kernel) can optionally and preferably be used between sets of parallel feature map layers, and also between the last set of parallel feature map layers and the output layers. An up-sampling kernel can optionally and preferably be used to feed one of the sets of parallel feature map layers by the fully connected layers.

Second neural subnetwork 36 can be a CNN having input layers, one or more sets of parallel feature map layers, and one or more output layers. A convolutional kernel can be used to receive features from the input layers and provide features to a set parallel feature map layers, and a down-sampling kernel (e.g., a max pooling kernel) can optionally and preferably be used between sets of parallel feature map layers. The output layer (that is concatenated at layer 42 of subnetwork 40) is optionally and preferably a fully connected layer, optionally and preferably receiving features from the last set of parallel feature map layers.

First neural subnetwork 32 can be a CNN having an input layer, one or more sets of parallel feature map layers, and one or more output layers. Convolutional kernels and down-sampling kernels (e.g., a max pooling kernel) can be alternately be used between sets of parallel feature map layers. A convolutional kernel is optionally and preferably used between the input layer and the first set of parallel feature map layers.

While subnetwork 40 combines the output of subnetworks 32 and 36 it was found by the Inventors of the present invention that it is also beneficial to split the output of at last one of subnetworks 32 and 36 such that the respective output are combined by shared subnetwork 40 but are also processed separately. This can be done by means of an additional neural network layer or an additional subnetwork that receives the output of the respective subnetwork but not the other subnetwork. Shown in FIG. 2 is a first additional neural network layer 52 that receives the output of subnetwork 32 and a second neural network layer 56 that receives the output of subnetwork 36. Each of the additional layers 52 and 56 can separately calculate a score using the output vector of the respective subnetwork. The advantage of these embodiments is that they allow distinguishing between the detection accuracy of the two networks. For example, an image can be assigned with a first detection score as calculated by layer 52, and a second detection score as calculated by layer 56. These scores can be compared or combined, for example, using a weighted sum.

Subnetworks 48 and 30, including output layer 56, can be used without subnetworks 32 for generating a training subset of images. This is particularly useful when the number of images in the training set is large and it is desired to initially classify the images by a machine (e.g., a network including subnetworks 48 and 30 and output layer 56 but does not include subnetworks 32) before presenting them to the human observer. In these embodiments, the output of layer 56 can be used to initially select a training subset of images, for example, only images suspected as containing the target, or both images suspected as containing the target and images suspected as not-containing the target with a predetermined ratio therebetween.

Once the training subset of images is obtained, by the use of a network including subnetworks 48 and 30 and output layer 56 but does not include subnetwork 32, one or more training iterations can be executed without autoencoder subnetwork 48 but using both subnetworks 32 and 36. In these iterations, the output of layer 52 is fed into subnetwork 36, bypassing autoencoder subnetwork 48.

Figure 3:
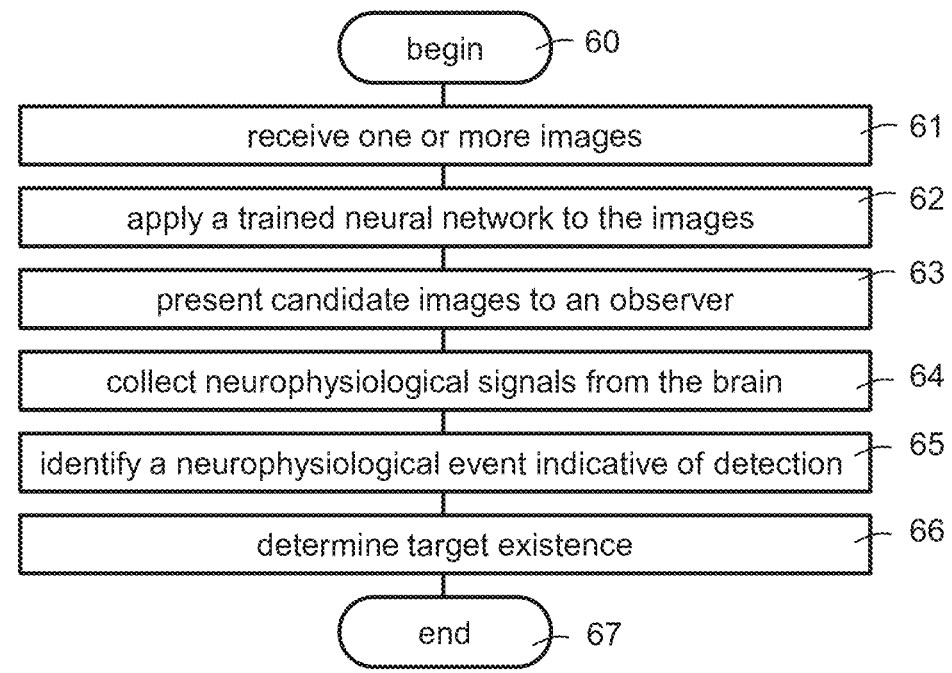
FIG. 3 is a flowchart diagram of a method suitable for image classification, according to some embodiments of the present invention.

FIG. 3 is a flowchart diagram of a method suitable for image classification, according to some embodiments of the present invention. The method begins at 60 and continues to 61 at which one or more images are received. When the received image is large, image is optionally and preferably tiled into a plurality of tiles, each to be used by the method as a separate input image as further detailed hereinabove. Alternatively, the method can receive a plurality of input images at 61. Also contemplated are embodiments in which the method receives a plurality of images, and tiles one or more or each of these images.

The method proceeds to 62 at which a trained image classification neural network, such as, but not limited to, network 30, is applied to each image to detect candidate images suspected as being occupied by a target. The method optionally and preferably proceeds to 63 at which an observer is presented with each of the candidate images as a visual stimulus, to 64 at which neurophysiological signals are collecting from the observers brain, and to 65 at which the neurophysiological signals are processed to identify a neurophysiological event indicative of a detection of the target by the observer as further detailed hereinabove. The method can then proceed to 66 at which an existence of target in the image is determined based, at least in part, on the identification of neurophysiological event. The determination 66 can be binary, in which case the image is assigned with a binary score which can assume one value (e.g., "1") when the image is identified as containing the target, and another value (e.g., "0") when the image is identified as not containing the target. The determination 66 can alternatively be non-binary, in which case the image is assigned with a non-binary score which can assume a value within a range of discrete or continuous values indicative of the likelihood that the image contains the target or the similarity between the target and an object in the image. The score can be, for example, the score calculated during the processing of the neurophysiological signals as further detailed hereinabove.

The method ends at 67.

The advantage of using method 60 is that the observer is presented only with images that have been preliminarily identified by the neural network as candidate images. This significantly improves the detection accuracy, reduces the processing time, and observer's fatigue.

Figure 4:
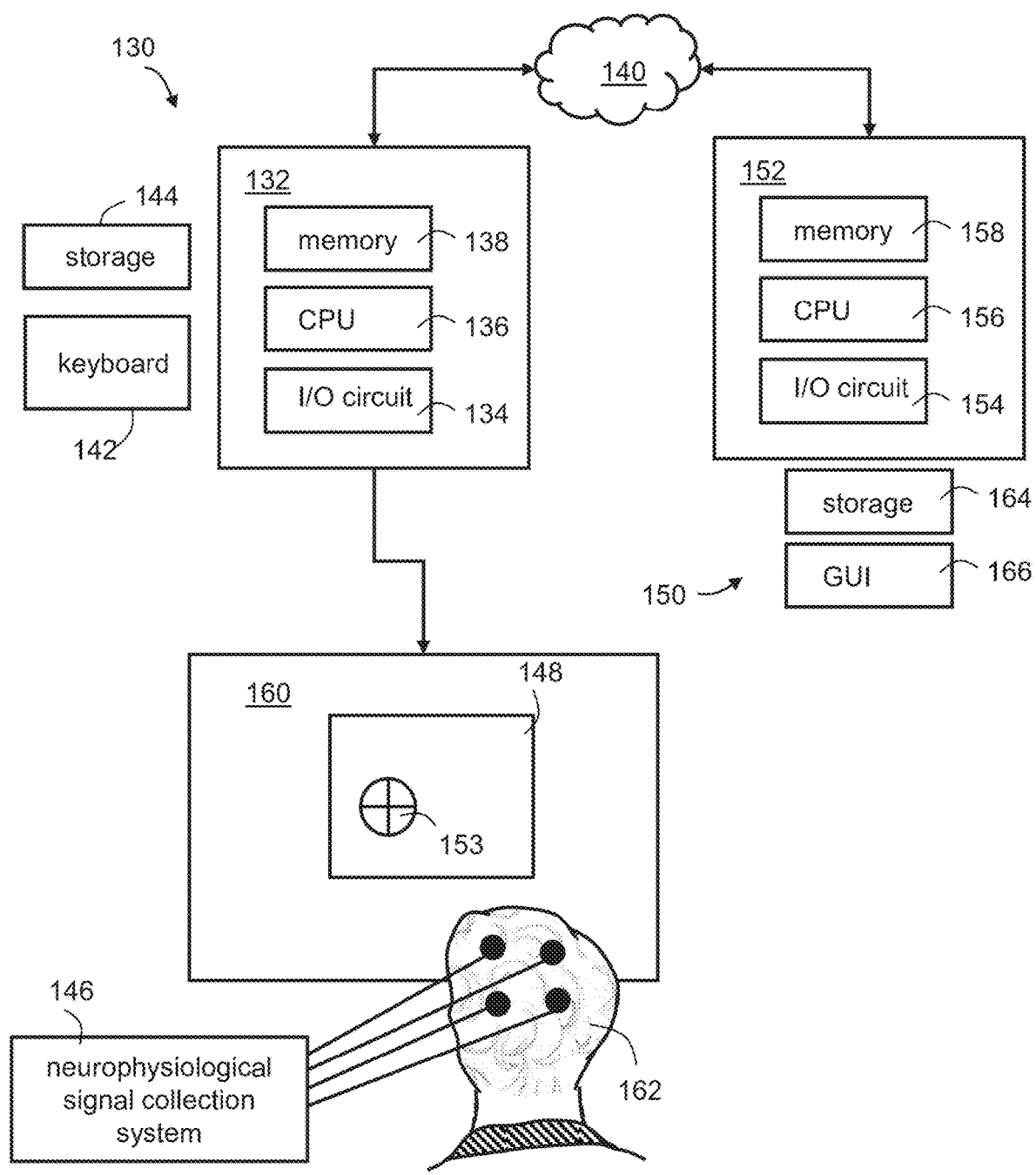
FIG. 4 is a schematic illustration of a system according to some embodiments of the present invention.

Reference is now made to FIG. 4 which is a schematic illustration of a system 130, according to some embodiments of the present invention. System 130 comprises a data processor 132, a display 160 communicating with data processor 132, and a neurophysiological signal collection system 146. System 130 can be used for executing any of the operations, e.g., all the operations of the methods described above. System 130 can be a stationary target identification system, or be, or combined with, a mobile system, such as, but not limited to, a virtual reality system of augmented reality system.

Neurophysiological signal collection system 146 optionally and preferably communicates with 132 and is configured for collecting neurophysiological signals from a brain of an observer presented with an image 148 as a visual stimulus for detecting a target 153 in image 148.

Data processor 132, typically comprises an input/output (I/O) circuit 134, a data processing circuit 136, such as a central processing unit (CPU), e.g., a microprocessor, and a memory 138 which typically includes both volatile memory and non-volatile memory. I/O circuit 134 is used to communicate information in appropriately structured form to and from other CPU 136 and other devices or networks external to system 130. CPU 136 is in communication with I/O circuit 134 and memory 138. These elements can be those typically found in most general purpose computers and are known per se.

Display device 160 is shown in communication with data processor 132, typically via I/O circuit 134. Data processor 132 issues to display device 160 graphical and/or textual output images generated by CPU 136. A keyboard 142 can also be in communication with data processor 132, typically via I/O circuit 134.

Also shown is a remote computer 150 which may optionally and preferably be used according to some embodiments of the present invention and which can similarly include a hardware processor 152, an I/O circuit 154, a hardware CPU 156, a hardware memory 158. Optionally, remote computer 160 can include a graphical user interface 166. I/O circuits 134 and 154 of system 130 and computer 150 can operate as transceivers that communicate information with each other via a wired or wireless communication. For example, system 130 and computer 150 can communicate via a network 140, such as a local area network (LAN), a wide area network (WAN) or the Internet. Any of processors 132 and 152 can in some embodiments be a part of a cloud computing resource of a cloud computing facility.

Client 130 and server 150 computers can further comprise one or more computer-readable storage media 144, 164, respectively. Media 144 and 164 are preferably non-transitory storage media storing computer code instructions for executing selected operations of as further detailed herein, and processors 132 and 152 execute these code instructions. The code instructions can be run by loading the respective code instructions into the respective execution memories 138 and 158 of the respective processors 132 and 152. Each of storage media 144 and 164 can store program instructions which, when read by the respective processor, cause the processor to execute the methods as described herein.

Neurophysiological signal collection system 144 optionally and preferably communicates with data processor 132 and is configured for collecting neurophysiological signals from a brain of an observer 162 as further detailed hereinabove.

In some embodiments of the invention data processor 132 of system 130 is configured for executing the method described herein. The image(s) used by the method can be retrieved by processor 132 from storage 144 or be transmitted from computer 150 to processor 152 over network 140. Also contemplated are embodiments in which one or more images are retrieved by processor 132 from storage 144 and one or more images are transmitted from computer 150 to processor 152 over network 140. For example, images forming a training set can be retrieved from storage 144, and images to be classified by the method of the present embodiments can be transmitted over network 140. Once the image classification method determine the existence of the target in the image, a detection score can be transmitted from system 130 to computer 150 for displaying the detection score and optionally and preferably also the image on GUI 166.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Representative Implementation

This example describes a representative implementation of the technique of the present embodiments. The implementation is described for the case of a large input image that is tiled by the method. One of ordinary skills in the art, provided with the details described herein would know how to implement at the technique also for the case of individual images of an image set.

In case of large images, such as aerial images or high resolution images from cameras covering wide areas, an experienced human observer is optionally and preferably presented, preferably in a RSVP mode, with those parts of the image that may contain potential targets or objects of interest in order to increase the observer's efficiency. In various exemplary embodiments of the invention other parts of the image are not presented to the observer.

Some embodiments of the invention provide an iterative process that streamlines the procedure of image selection to be shown to human observer using output of visual object recognition neural network, and improves the training of the neural network using the output of human observer's classification.

A representative framework includes one or more of the following operations.

1. Training, or using a pre-trained neural network for visual object recognition. The network can be trained to detect objects similar to the objects of interest in a task.
2. Using the trained object recognition neural network for feature extraction from the input image.
3. Adding additional autoencoder layer for unsupervised feature learning to better represent the input image.
4. Forming a block of N image patches, optionally and preferably sized for allowing sequenced human observation in RSVP mode. The initial block can be formed using one or more of the following:
   4.1. Unsupervised clustering of the extracted features to K clusters. Clusters may match different types of objects presented in the image, with one of the clusters being objects resembling the targets. Then, sampling of K clusters to form a block of images—selecting N representations from each cluster and reconstructing from them small image patches optimized for human observation in RSVP mode. To elicit the sought target detection ERP response (e.g., in accordance with the oddball paradigm), the ratio of targets to non-targets is optionally and preferably from about 1 to about 10. Therefore, K can be chosen to be, e.g., about 10. The largest cluster can contain distracting features. In some embodiments, this cluster is omitted to reduce the amount of data to be reviewed.
   4.2. Random sampling of N patches
   4.3. In case a target example is available (for example, in the form of a reference image), an initial target model is optionally and preferably built by augmenting the reference image (e.g., by creating rotated images) so as to increase the amount of data for the training, and using unsupervised autoencoder to learn the features representing the reference image. Then, N image patches can be selected based on their distance from the mean image.
5. A block of images is presented to the human observer, optionally and preferably in RSVP mode, and EEG responses for single trials are classified with classification scores assigned to each image.
6. Images classified by EEG responses are assigned labels based on the classification scores and fed back to the object recognition neural network in order to update its training, process known as fine-tuning. It is possible to fine-tune all the layers of network, or only the latter layers, which contain less generic and more details-specific features.
7. Repeating stages 2-6 in several iterations until predefined conversion threshold is achieved. With every new iteration, the images selected to be shown to the human observer are optionally and preferably based on features more accurately describing potential targets.

Figure 5:
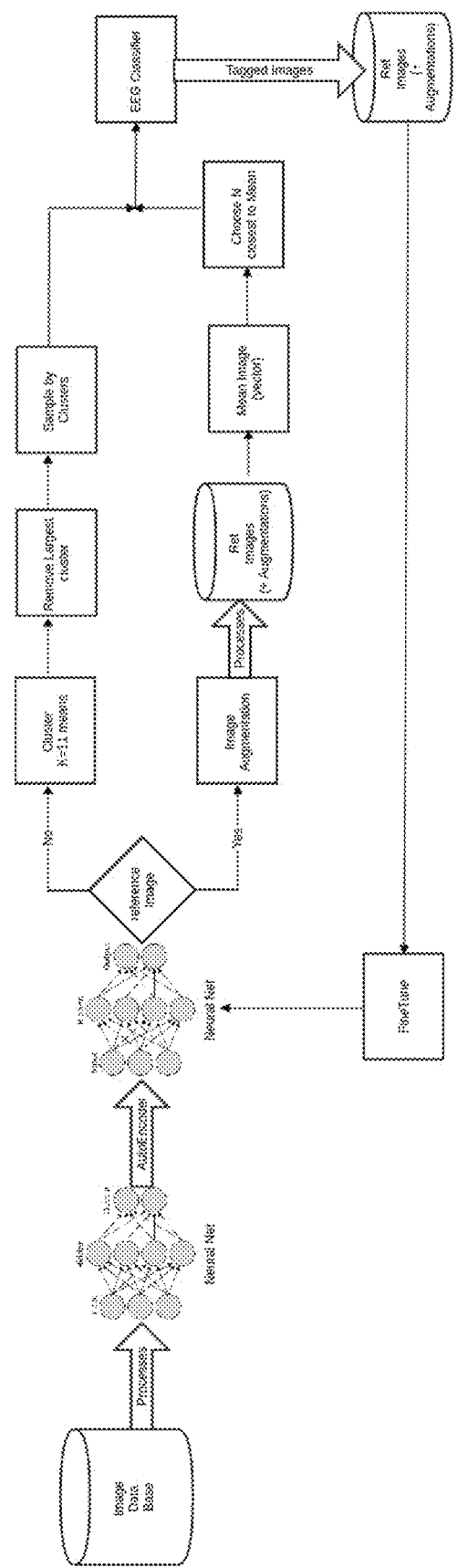
FIG. 5 is a schematic illustration of representative implementation of some embodiments of the present invention.

FIG. 5 schematically illustrates the representative implementation, according to some embodiments of the present invention.

Examples 2 and 3 below include results of simulation which was run using the framework shown in FIG. 1 on a large satellite image. Labels were introduced to simulate the EEG classification stage (see stage 6 above).

Figure 6:
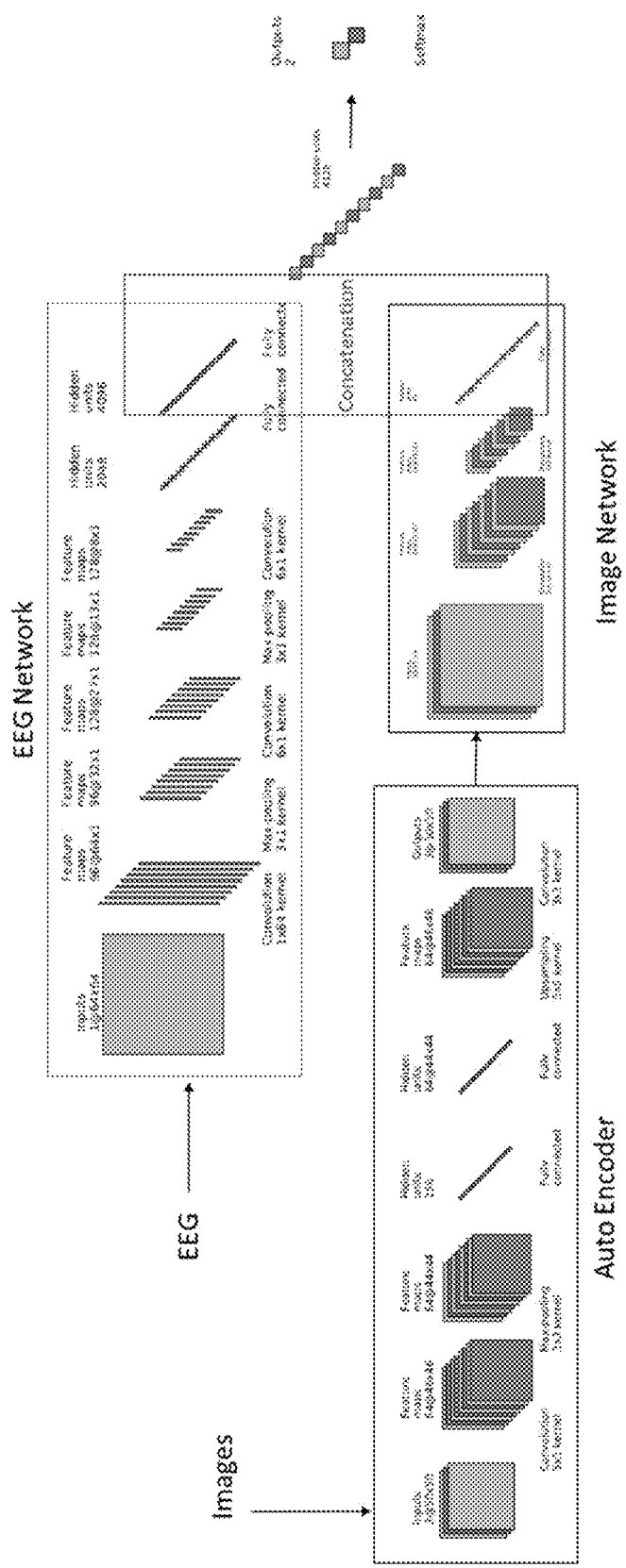
FIG. 6 is a schematic illustration of a multimodal EEG-Image neural network for image classification, used in experiments performed according to some embodiments of the present invention.

The accuracy of the detection and the efficiency of the training can be optionally and preferably improved using a multimodal EEG-Image neural network for image classification, illustrated in FIG. 6. The network optionally and preferably receives as input an image and a single-trial EEG data corresponding to the brain response for this image. The network is trained to classify these inputs into a detection score using a feature-level fusion. Specifically, the network learns features separately for each type of data, and later joins these features for the final layers. This also allows the network to use features from both modalities to provide a detection score and to identify, for example, when one of the modalities would not have enough support.

The targets to be classified may be unknown or vary. In such cases, the image part of the network cannot be trained on target images. To solve this problem, the unsupervised autoencoder model is firstly used to train the network on only images that do not contain the target ("semi-supervised network"). The autoencoder model learns how to reconstruct the images from the features, and produces features that represent pertinent information about the images. Then, the features extracted by the autoencoder are used as input to the multimodal network, instead of the original images. Another input is the labeled EEG data. The network optionally and preferably starts with separate layers for each input, continues with a layer that concatenates features from each input and ends with a final classification layer. Examples 2 and 3, below, include results of application of the multimodal network on imagery data.

Example 2

Computer Simulation

Figure 7:
FIG. 7 is an aerial image use as an input image in simulations performed according to some embodiments of the present invention.

The input image to the framework was a large aerial image shown in FIG. 7. The target was defined as man-made buildings. The input image included a total of 101 targets.

Figure 8A:
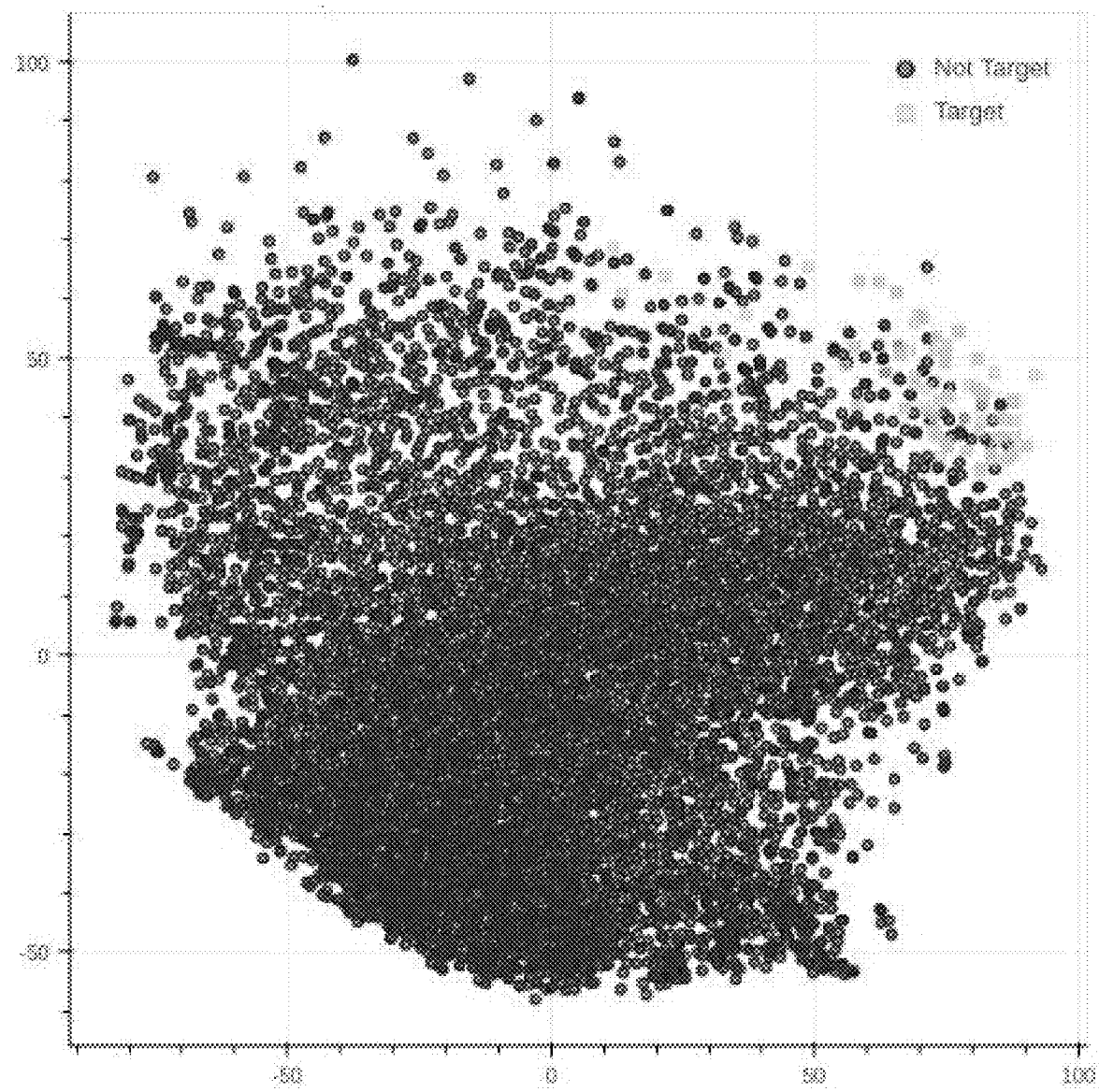
FIGS. 8A-D show target identification maps obtained in simulations applied according to some embodiments of the present invention to the aerial image in FIG. 7.

FIG. 8A shows an initial map describing the input image. Square symbols (yellow in the color version) describe objects identified as targets and round symbols (purple in the color version) describe objects identified as non-targets.

Figure 8B:
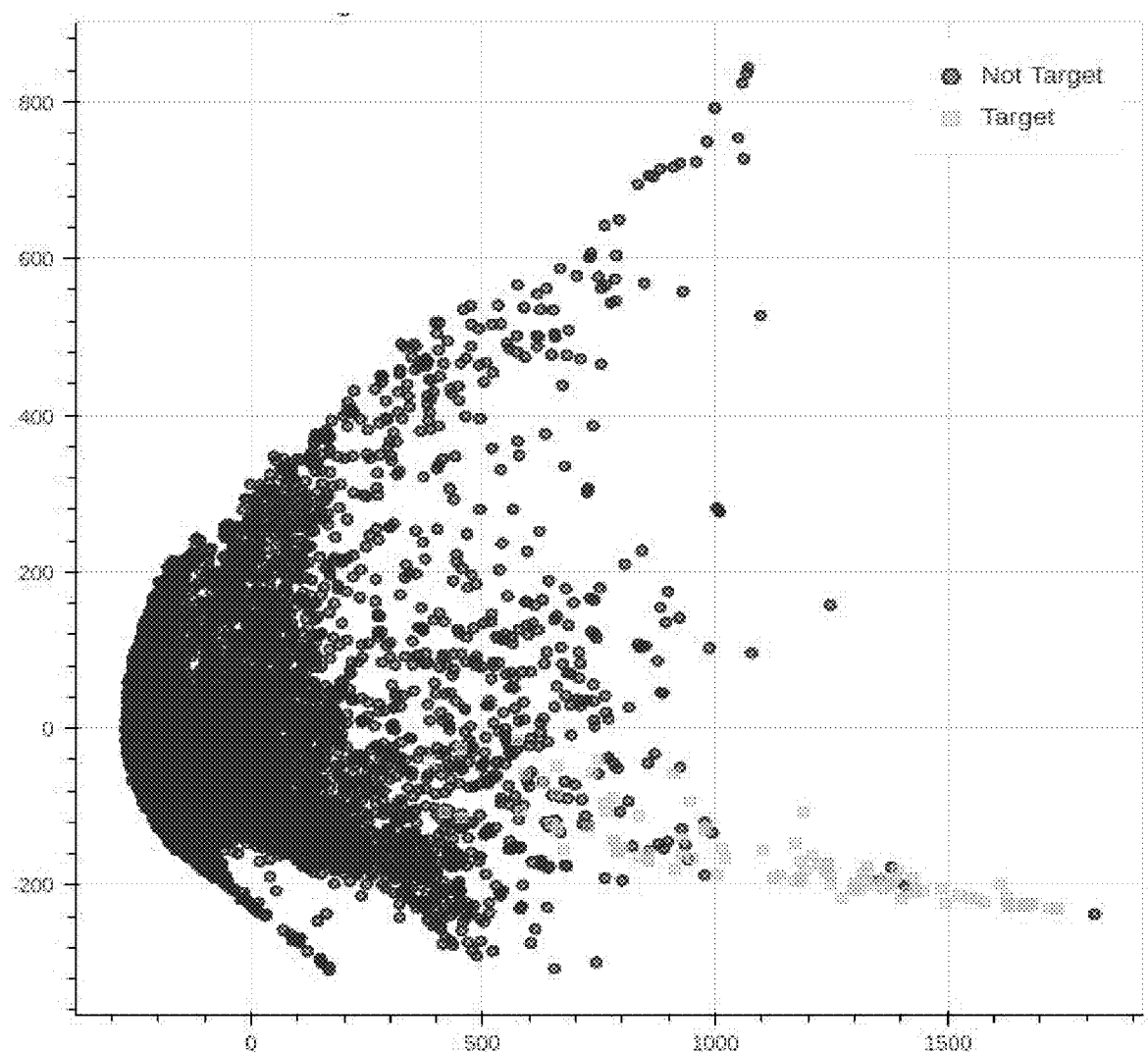

FIG. 8B shows the map after the first iteration. The portion of the images to be presented to the observer that was selected randomly constituted about 1.5% of the total number of images, and the portion of the images to be presented to the observer that was selected by clustering was about 10%. The number of target in RSVP was 24, and the number of non-target in RSVP was 276.

Figure 8C:
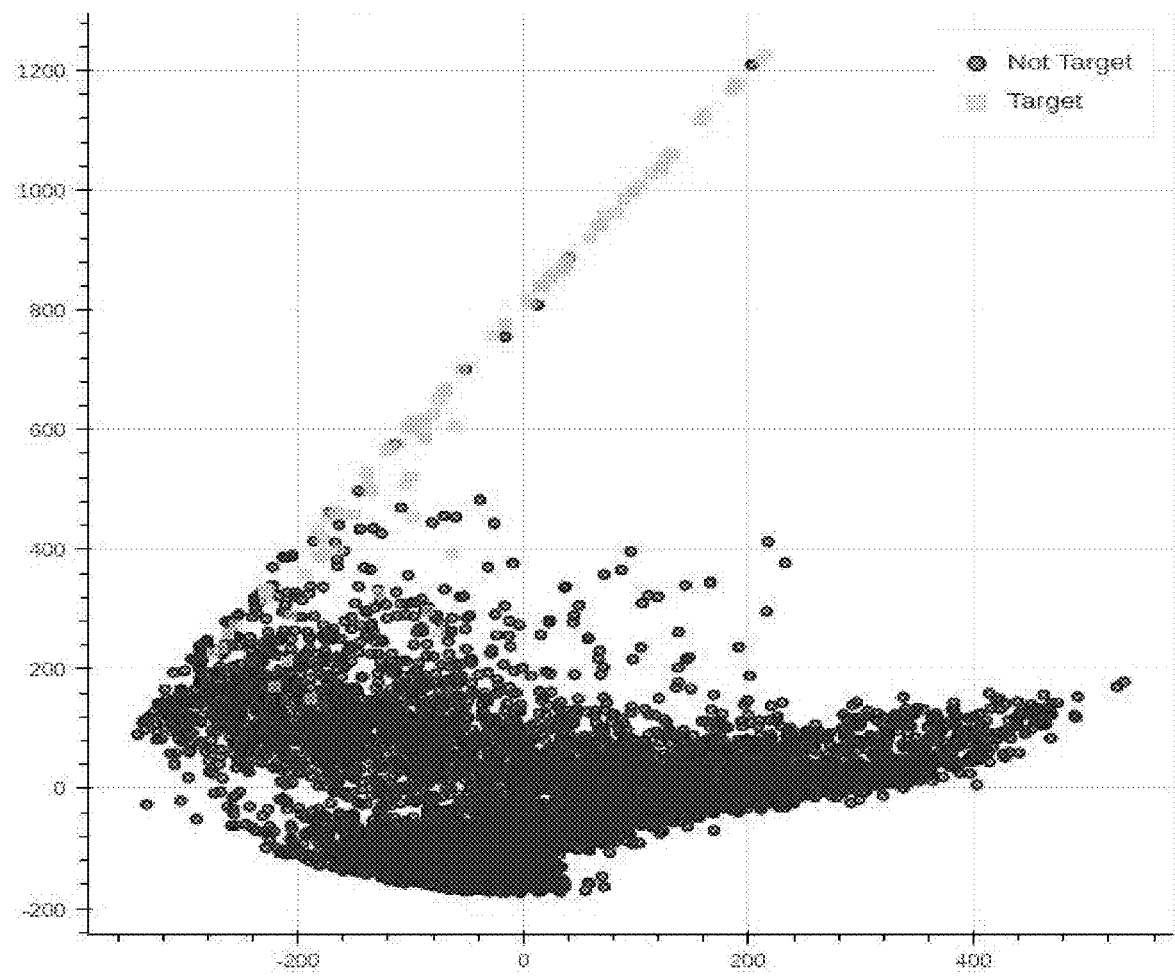

FIG. 8C shows the map after the second iteration. The portion of the images to be presented to the observer that was selected randomly constituted about 1.5% of the total number of images, and the portion of the images to be presented to the observer that was selected by clustering was about 10.2%. The number of target in RSVP was 76, and the number of non-target in RSVP was 224.

Figure 8D:
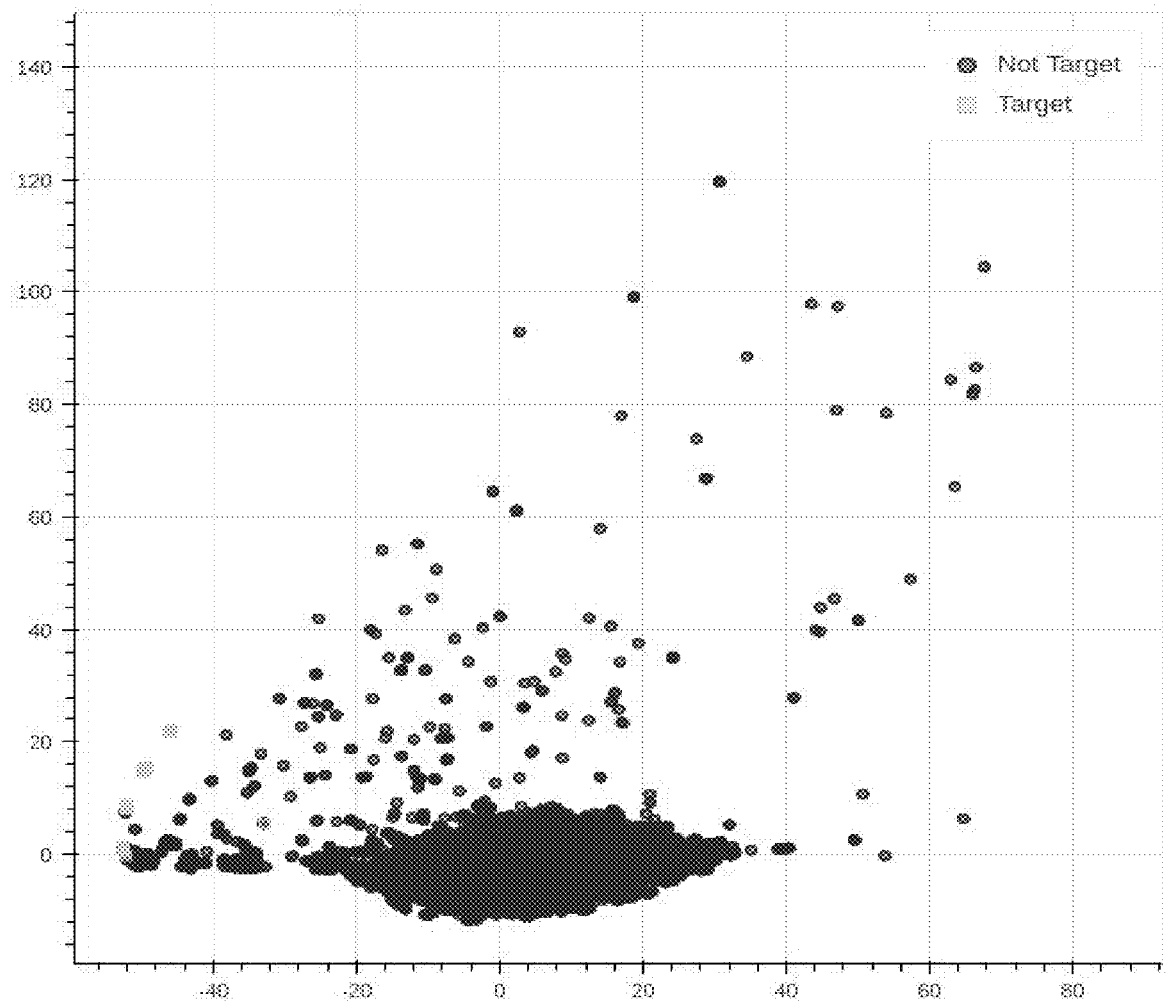

FIG. 8D shows the map after the third iteration. The portion of the images to be presented to the observer that was selected randomly constituted about 1.5% of the total number of images, and the portion of the images to be presented to the observer that was selected by clustering was about 10.19%. The number of target in RSVP was 1, and the number of non-target in RSVP was 299.

The total number of target detected was 24 (first iteration)+76 (second iteration)+1 (third iteration)=101. Thus, after three iterations, the technique optionally and preferably was able to identify all the targets with 100% accuracy and with no false positive detections.

Example 3

Performance of Multimodal Network with Autoencoder

The performance was evaluated on 12 different RSVP sessions involving 2 subjects (6 sessions for each subject), referred to below as subject A and subject B. The task was to detect man-made objects. Table 1, below, summarizes the performance for each session.

TABLE 1

| Subject/Session | Correct | Hits | False Alarms | AUC | Balanced Accuracy |
|---|---|---|---|---|---|
| A-1 | 89.91 ± 0.6 | 75.28 ± 3.2 | 8.95 ± 0.8 | 0.90 ± 0.03 | 83.16 ± 1.7 |
| A-2 | 84.59 ± 1.3 | 76.01 ± 2.5 | 15.14 ± 1 | 0.87 ± 0.02 | 80.43 ± 1.4 |
| A-3 | 81.64 ± 1 | 73.61 ± 2 | 17.65 ± 1.1 | 0.87 ± 0.02 | 77.97 ± 1.2 |
| A-4 | 86.35 ± 1.2 | 70.58 ± 3.5 | 12.6 ± 1.3 | 0.86 ± 0.03 | 78.98 ± 1.8 |
| A-5 | 88.16 ± 1.5 | 71.58 ± 2.6 | 10.77 ± 1.5 | 0.89 ± 0.02 | 80.40 ± 1.7 |
| A-6 | 84.62 ± 0.9 | 75.21 ± 1.8 | 14.65 ± 0.7 | 0.89 ± 0.03 | 80.28 ± 0.9 |
| B-1 | 90.29 ± 1 | 73.43 ± 2.2 | 8.57 ± 1 | 0.87 ± 0.04 | 82.43 ± 1.3 |
| B-2 | 84.7 ± 1.3 | 73.89 ± 4 | 14.57 ± 1.2 | 0.86 ± 0.03 | 79.66 ± 2.4 |
| B-3 | 87.92 ± 1.7 | 74.09 ± 5.1 | 11.07 ± 1.8 | 0.90 ± 0.02 | 81.51 ± 2.9 |
| B-4 | 81.44 ± 1.5 | 78.09 ± 3.6 | 18.24 ± 1.6 | 0.88 ± 0.03 | 79.92 ± 2 |
| B-5 | 84.23 ± 1.2 | 75.04 ± 2.4 | 15 ± 1.3 | 0.90 ± 0.03 | 80.01 ± 1.5 |
| B-6 | 90 ± 0.9 | 75.73 ± 3.2 | 8.96 ± 0.9 | 0.91 ± 0.03 | 83.38 ± 1.6 |
| Mean | 86.15 ± 3.1 | 74.38 ± 2.2 | 13.01 ± 1.4 | 0.88 ± 0.01 | 80.68 ± 1.1 |

Three additional performance analyses were conducted. In a first additional performance analysis the EEG network shown in FIG. 6 was evaluated, in a second additional performance analysis the image network in FIG. 6 was evaluated, and in a third additional performance analysis the combination of the EEG network and the image network of FIG. 6, without the autoencoder, was evaluated. In these three analyses, the images were a priori labeled as either containing or not containing the target (binary labeling), and the binary labels were fed to the respective network for supervised learning.

Figure 9A:
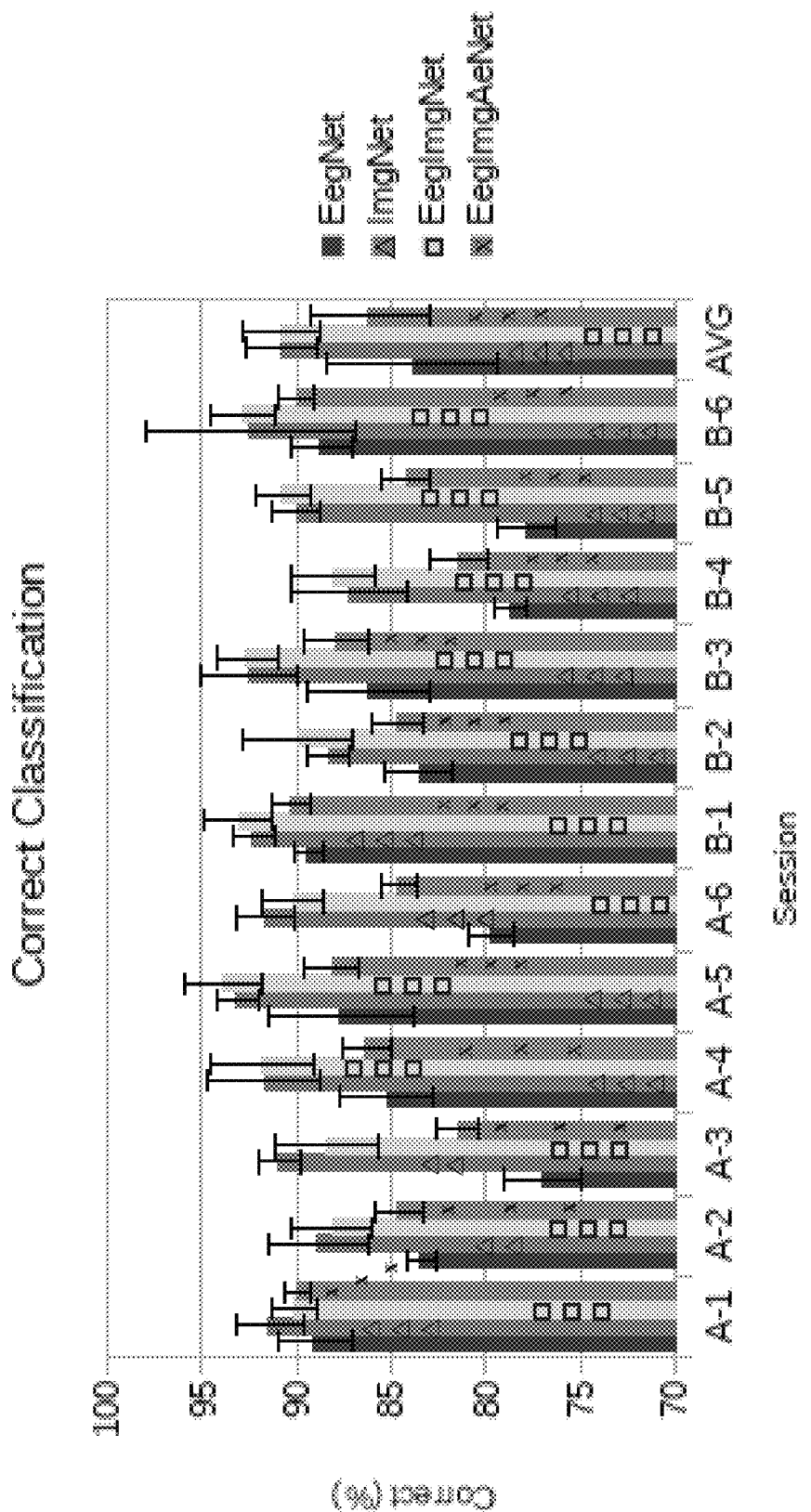
FIGS. 9A-D show comparisons between artificial neural networks, obtained in experiments performed according to some embodiments of the present invention.
Figure 9B:
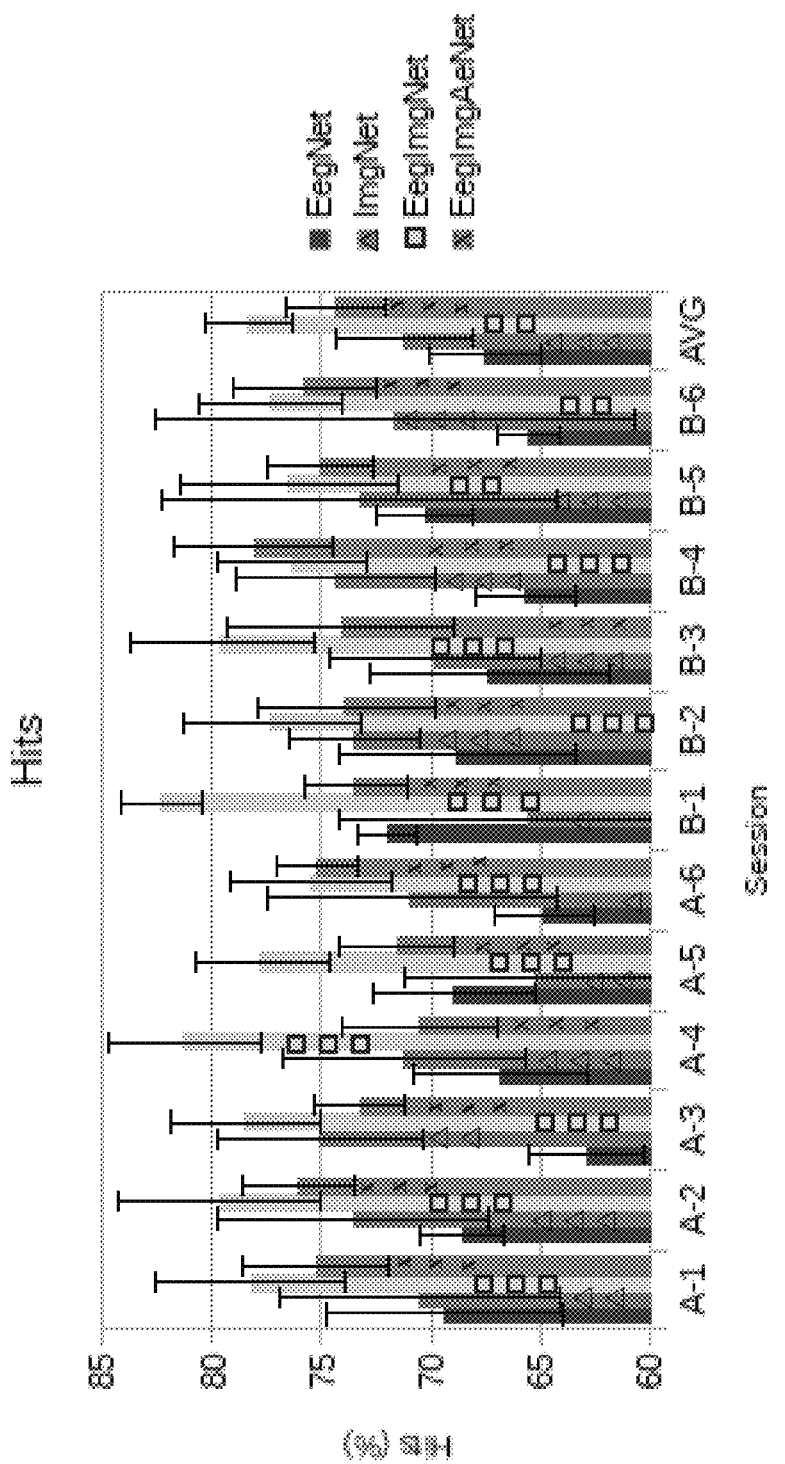
Figure 9C:
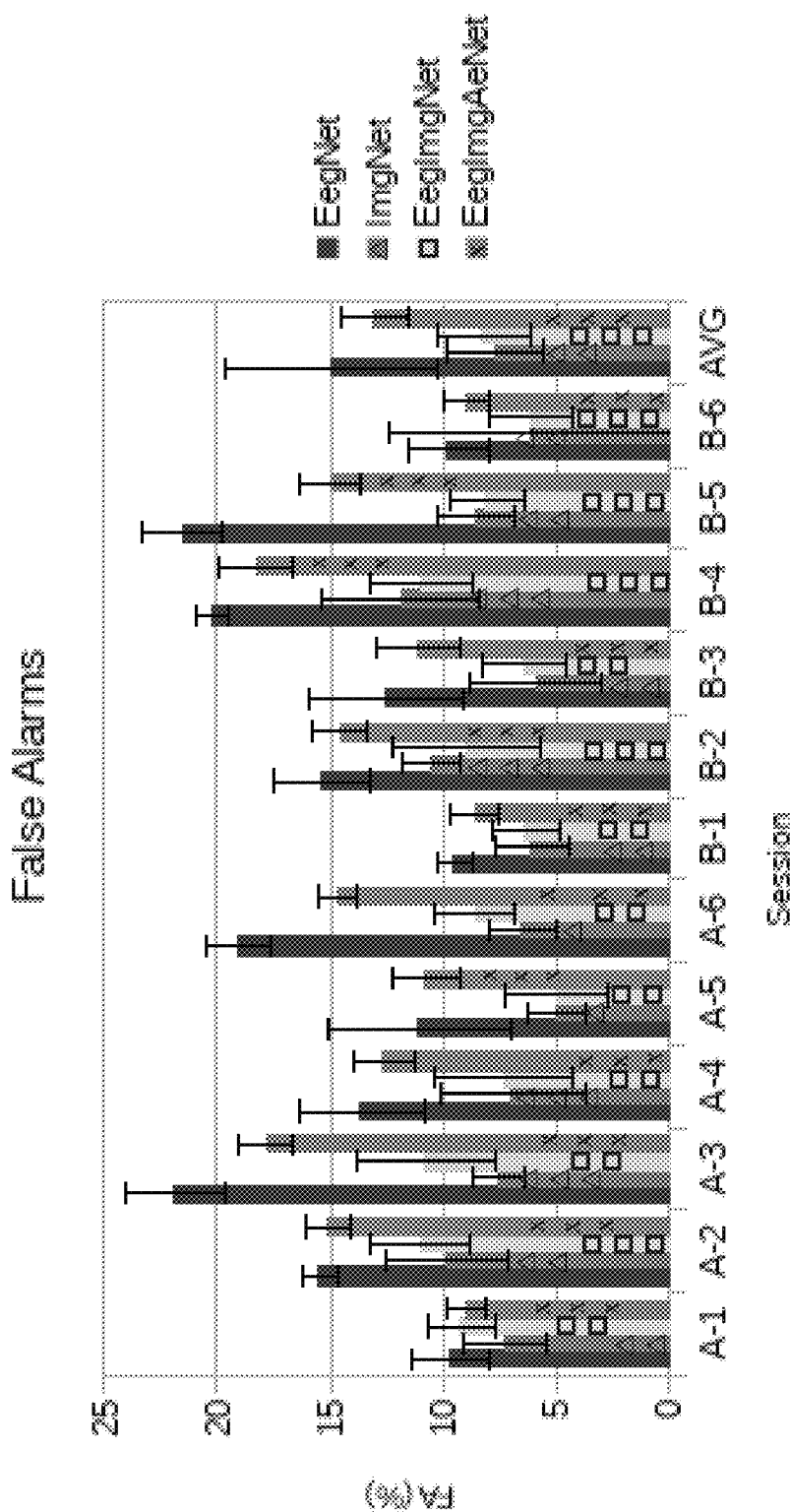
Figure 9D:
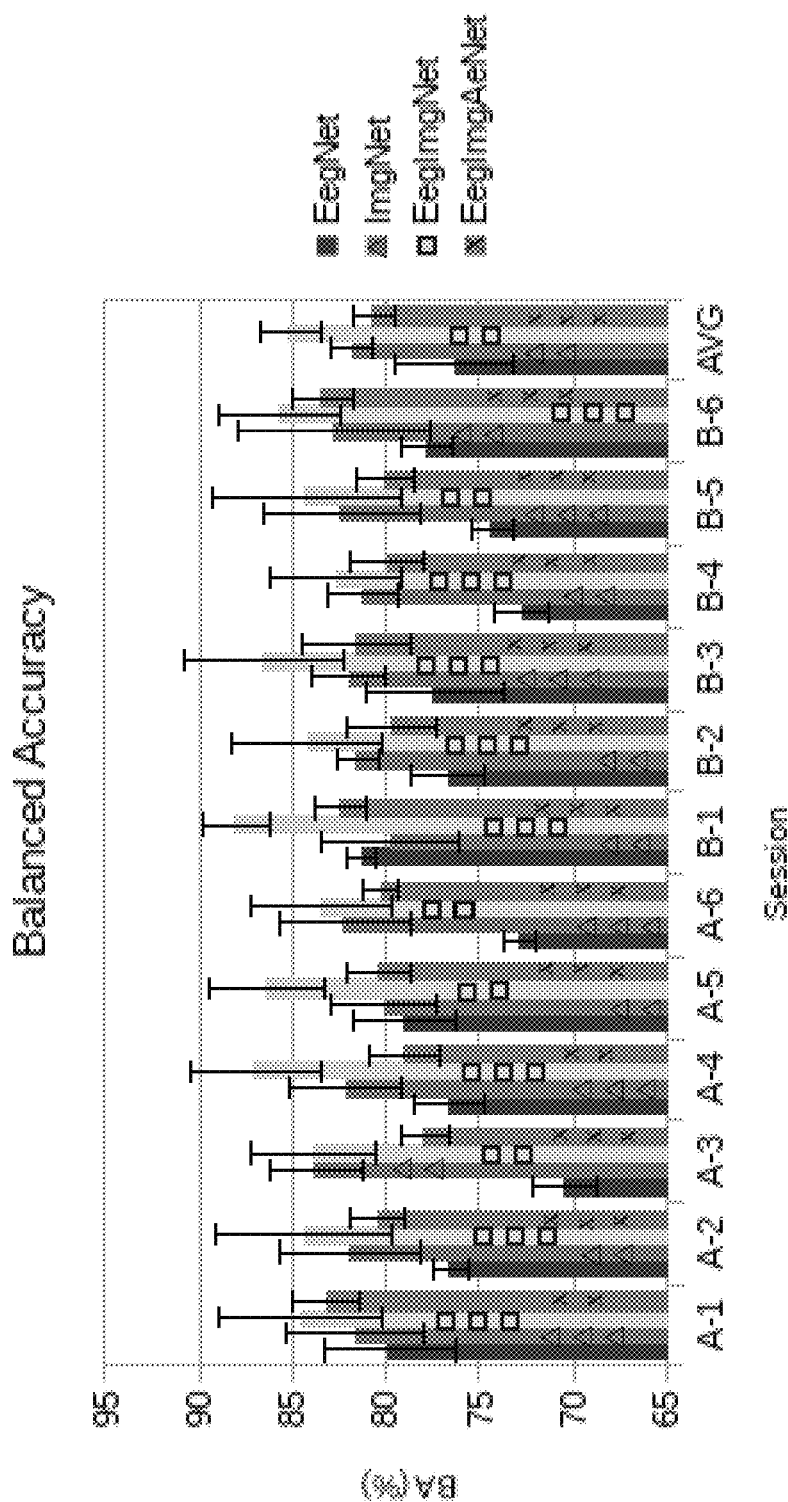

FIGS. 9A-D compare the performance of the multimodal network shown in FIG. 6, with the performance other networks. For each of the analyzed networks in this example, FIG. 9A shows histograms describing percentage of correct classification, FIG. 9B shows histograms describing hit percentages, FIG. 9C shows histograms describing percentage of false alarms, and FIG. 9D shows histograms describing balanced accuracy. In FIGS. 9A-D, the results designated EEGIMGAeNet correspond to the multimodal network with autoencoder shown in FIG. 6, the results designated EegNet correspond to the EEG network in FIG. 6, the results designated ImgNet correspond to the Image network in FIG. 6, and the results designated EegImgNet correspond to the combination of the EEG network and the Image network of FIG. 6 without the autoencoder.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of training an image classification neural network, the method comprising:
    presenting a first plurality of images to an observer as a visual stimulus, while collecting neurophysiological signals from a brain of said observer;
    processing said neurophysiological signals to identify a neurophysiological event indicative of a detection of a target by said observer in at least one image of said first plurality of images;
    training the image classification neural network to identify the target in the image, based on said identification of said neurophysiological event; and
    storing said trained image classification neural network in a non-transitory computer-readable storage medium;
    wherein the method comprises tiling an input image into a plurality of image tiles, wherein said first plurality of images comprises a portion of said plurality of image tiles.

2. The method according to claim 1, further comprising applying unsupervised clustering to a second plurality of images, and selecting said first plurality of images from said second plurality of images based on said unsupervised clustering.

3. The method according to claim 2, wherein said second plurality of images comprises said plurality of image tiles.

4. The method according to claim 1, comprising randomly selecting said first plurality of images from a second plurality of images.

5. The method according to claim 1, comprising receiving a reference image including said target, and selecting said first plurality of images from a second plurality of images responsively to said reference image.

6. The method according to claim 1, further comprising:
    applying said trained image classification neural network to said second plurality of images to detect therein candidate images suspected as being occupied by said target, wherein said second plurality of images comprises at least one image of said first plurality of images;
    re-defining said second plurality of images, wherein at least one image of said redefined second plurality of images is a candidate image as detected by said trained image classification neural network; and
    repeating said presentation, said collection and processing of said neurophysiological signals, and said training for at least one image of said redefined first plurality of images, thereby iteratively training the image classification neural network.

7. The method according to claim 6, further comprising tiling an input image into a plurality of image tiles, wherein said second plurality of images comprises said plurality of image tiles, and wherein said first plurality of images comprises a portion of said plurality of image tiles.

8. The method according to claim 7, wherein said re-defining said second plurality of images, comprises re-tiling said input image into a plurality of images, wherein at least one image of said retiled input image comprises said candidate image.

9. The method according to claim 6, further comprising applying unsupervised clustering to said second plurality of images, and selecting said first plurality of images from said second plurality of images based on said unsupervised clustering.

10. The method according to claim 6, comprising randomly selecting first plurality of images from said second plurality of images.

11. The method according to claim 1, comprising receiving a reference image including the target, and selecting first plurality of images from said second plurality of images responsively to said reference image.

12. The method according to claim 1, wherein said image classification neural network is a convolutional neural network.

13. The method according to claim 1, wherein said image classification neural network comprises a first neural subnetwork configured for receiving and processing said neurophysiological data, a second neural subnetwork configured for receiving and processing said second plurality of images, and a shared subnetwork having a neural network layer receiving and combining outputs from both said first neural subnetwork and said second neural subnetwork.

14. The method according to claim 13, wherein said image classification neural network is a convolutional neural network and at least one of said first and said second neural subnetworks is a convolutional neural subnetwork.

15. The method according to claim 13, wherein said image classification neural network comprises a first separate output layer for said first neural subnetwork outputting a first score, and second separate output layer for said second neural subnetwork outputting a second score, and wherein the method comprises combining said first score with said second score to a combined score, labeling said image with said combined score, and using said label in at least one iteration of said training.

16. The method according to claim 15, wherein said combined score is a weighted sum of said first and said second score.

17. The method according to claim 1, wherein said image classification neural network comprises an autoencoder subnetwork for unsupervised feature learning.

18. The method according to claim 17, wherein said autoencoder subnetwork is used for selecting said first plurality of images.

19. The method according to claim 17, wherein said autoencoder subnetwork is used only for selecting said first plurality of images, but not for said training based on said identification of said neurophysiological event.

20. The method according to claim 1, further comprising scoring said neurophysiological event using said neurophysiological signals, wherein said training is based at least in part on said score.

21. The method according to claim 20, further comprising using said score for determining a level of similarity of said target to an object in an image observed by said observer.

22. The method according to claim 1, further comprising presenting to the observer a stimulus describing said target prior to said presentation of said first plurality of images, wherein said stimulus comprises at least one stimulus selected from the group consisting of a visual stimulus, a textual stimulus, an auditory stimulus and an olfactory stimulus.

23. The method according to claim 1, further comprising presenting to the observer a stimulus complementary to said target prior to said presentation of said first plurality of images, wherein said stimulus comprises at least one stimulus selected from the group consisting of a visual stimulus, a textual stimulus, an auditory stimulus and an olfactory stimulus.

24. A system for training an image classification neural network, comprising:
   a neurophysiological signal collection system, configured for collecting neurophysiological signals from a brain of an observer; and
   a data processor, communicating with said neurophysiological signal collection system and being configured for executing the method according to claim 1.

25. A method of classifying an image, comprising:
   executing the method according to claim 1 to train the image classification neural network; and
   applying said trained image classification neural network to the image to determine an existence of said target in the image based on a score generated by an output layer of said trained image classification neural network.

26. A method of classifying an image, comprising:
   applying the method according to claim 1 to the image;
   applying said trained image classification neural network to the image to determine whether the image is suspected as being occupied by a target;
   presenting the image to the observer as a visual stimulus, while collecting neurophysiological signals from a brain of said observer;
   determining an existence of said target in the image based, at least in part, on said identification of said neurophysiological event.

27. A method of training an image classification neural network, the method comprising:
   presenting a first plurality of images to an observer as a visual stimulus, while collecting neurophysiological signals from a brain of said observer;
   processing said neurophysiological signals to identify a neurophysiological event indicative of a detection of a target by said observer in at least one image of said first plurality of images;
   training the image classification neural network to identify the target in the image, based on said identification of said neurophysiological event; and
storing said trained image classification neural network in a non-transitory computer-readable storage medium;
   wherein the method comprises:
   applying said trained image classification neural network to a second plurality of images to detect therein candidate images suspected as being occupied by said target, wherein said second plurality of images comprises at least one image of said first plurality of images;
   re-defining said second plurality of images, wherein at least one image of said redefined second plurality of images is a candidate image as detected by said trained image classification neural network; and
repeating said presentation, said collection and processing of said neurophysiological signals, and said training for at least one image of said redefined first plurality of images, thereby iteratively training the image classification neural network.

28. A method of training an image classification neural network, the method comprising:
   presenting a first plurality of images to an observer as a visual stimulus, while collecting neurophysiological signals from a brain of said observer;
   processing said neurophysiological signals to identify a neurophysiological event indicative of a detection of a target by said observer in at least one image of said first plurality of images;
   training the image classification neural network to identify the target in the image, based on said identification of said neurophysiological event; and
storing said trained image classification neural network in a non-transitory computer-readable storage medium;
   wherein said image classification neural network comprises a first neural subnetwork configured for receiving and processing said neurophysiological data, a second neural subnetwork configured for receiving and processing said second plurality of images, and a shared subnetwork having a neural network layer receiving and combining outputs from both said first neural subnetwork and said second neural subnetwork;
   wherein said image classification neural network comprises a first separate output layer for said first neural subnetwork outputting a first score, and second separate output layer for said second neural subnetwork outputting a second score; and
   wherein the method comprises combining said first score with said second score to a combined score, labeling said image with said combined score, and using said label in at least one iteration of said training.

29. A method of training an image classification neural network, the method comprising:
   presenting a first plurality of images to an observer as a visual stimulus, while collecting neurophysiological signals from a brain of said observer;
   processing said neurophysiological signals to identify a neurophysiological event indicative of a detection of a target by said observer in at least one image of said first plurality of images;
   training the image classification neural network to identify the target in the image, based on said identification of said neurophysiological event; and
storing said trained image classification neural network in a non-transitory computer-readable storage medium;
   wherein said image classification neural network comprises an autoencoder subnetwork for unsupervised feature learning; and
   wherein said autoencoder subnetwork is used only for selecting said first plurality of images, but not for said training based on said identification of said neurophysiological event.

30. A method of classifying an image, comprising:
   training an image classification neural network to provide a trained image classification neural network; and applying said trained image classification neural network to the image to determine an existence of said target in the image based on a score generated by an output layer of said trained image classification neural network;

wherein training comprises:

presenting a first plurality of images to an observer as a visual stimulus, while collecting neurophysiological signals from a brain of said observer;

processing said neurophysiological signals to identify a neurophysiological event indicative of a detection of a target by said observer in at least one image of said first plurality of images;

training the image classification neural network to identify the target in the image, based on said identification of said neurophysiological event; and storing said trained image classification neural network in a non-transitory computer-readable storage medium.

31. A method of classifying an image, comprising:

training an image classification neural network to provide a trained image classification neural network;

applying said trained image classification neural network to the image to determine whether the image is suspected as being occupied by a target;

presenting the image to the observer as a visual stimulus, while collecting neurophysiological signals from a brain of said observer;

determining an existence of said target in the image based, at least in part, on said identification of said neurophysiological event;

wherein training comprises:

presenting a first plurality of images to an observer as a visual stimulus, while collecting neurophysiological signals from a brain of said observer;

processing said neurophysiological signals to identify a neurophysiological event indicative of a detection of a target by said observer in at least one image of said first plurality of images;

training the image classification neural network to identify the target in the image, based on said identification of said neurophysiological event; and storing said trained image classification neural network in a non-transitory computer-readable storage medium.

\* \* \* \* \*